(12) United States Patent
Takaoka et al.

(10) Patent No.: US 7,900,013 B2
(45) Date of Patent: Mar. 1, 2011

(54) METHOD AND COMPUTER FOR DETERMINING STORAGE DEVICE

(75) Inventors: Nobumitsu Takaoka, Yokohama (JP);
Yuichi Taguchi, Sagamihara (JP);
Masayuki Yamamoto, Sagamihara (JP);
Takashige Iwamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 574 days.

(21) Appl. No.: 11/968,674

(22) Filed: Jan. 3, 2008

(65) Prior Publication Data

US 2008/0276061 A1  Nov. 6, 2008

(30) Foreign Application Priority Data

May 1, 2007 (JP) ............................... 2007-120614

(51) Int. Cl.
*G06F 12/00* (2006.01)
(52) U.S. Cl. ...................................... 711/170; 711/162
(58) Field of Classification Search .................. 711/162, 711/170
See application file for complete search history.

(56) References Cited

U.S. PATENT DOCUMENTS

| 5,920,884 | A | 7/1999 | Jennings, III et al. |
| 6,425,049 | B1 | 7/2002 | Yamamoto et al. |
| 2002/0103889 | A1* | 8/2002 | Markson et al. ............. 709/223 |
| 2003/0220991 | A1 | 11/2003 | Soejima et al. |
| 2003/0225861 | A1 | 12/2003 | Iwamura et al. |
| 2005/0198327 | A1 | 9/2005 | Iwamura et al. |
| 2006/0095697 | A1 | 5/2006 | Eguchi et al. |
| 2006/0206675 | A1* | 9/2006 | Sato et al. .................... 711/161 |
| 2007/0050684 | A1 | 3/2007 | Takaoka et al. |
| 2007/0055842 | A1 | 3/2007 | Abe et al. |
| 2007/0192538 | A1* | 8/2007 | Dawkins ..................... 711/114 |

FOREIGN PATENT DOCUMENTS

| JP | 2000-298557 | 10/2000 |
| JP | 2003-162495 | 6/2003 |

(Continued)

OTHER PUBLICATIONS

U.S. Appl. No. 10/828,286, filed Apr. 2004.
U.S. Appl. No. 11/340,280, filed Jan. 2006.
U.S. Appl. No. 11/520,647, filed Sep. 2006.
U.S. Appl. No. 11/603,089, filed Nov. 2006.
U.S. Appl. No. 11/609,438, filed Dec. 2006.
U.S. Appl. No. 11/684,781, filed Mar. 2007.

*Primary Examiner*—Jared I Rutz
(74) *Attorney, Agent, or Firm*—Brundidge & Stanger, P.C.

(57) ABSTRACT

A computer specifies the configuration of a first storage device by referencing first configuration information relating to the configuration of a first storage system including the first storage device, specifies one or more storage medium access performances corresponding to the first storage device by referencing the storage medium performance information, and calculates a first access performance index of the first storage device based on one or more specified storage medium access performances. The computer then references storage medium performance information and second configuration information relating to the configuration of a second storage system including a second storage device, and determines a second storage device having an access performance index that is at least equal to the calculated first access performance index.

5 Claims, 15 Drawing Sheets

FOREIGN PATENT DOCUMENTS

| | | |
|---|---|---|
| JP | 2003-337721 | 11/2003 |
| JP | 2003-345522 | 12/2003 |
| JP | 2004-13215 | 1/2004 |
| JP | 2005-182274 | 7/2005 |
| JP | 2005-250626 | 9/2005 |
| JP | 2007-72672 | 3/2007 |

* cited by examiner

FIG. 3

601: STORAGE MEDIUM MANAGEMENT INFORMATION

| STORAGE MEDIUM ID | TYPE | VENDOR | MODEL | REVISION | SERIAL NUMBER | RAID GROUP ID |
|---|---|---|---|---|---|---|
| 312 | HDD | HG | UL15 | 0010 | H0010-0010 | 2 |
| 313 | HDD | HG | UL15 | 0100 | H0010-0200 | 2 |
| ...... | ...... | ...... | ...... | ...... | ...... | ...... |
| 314 | FLD | EL | EL15 | 0010 | E0010-0001 | 3 |
| 315 | FLD | EL | EL15 | 0120 | E0120-0010 | 3 |
| ...... | ...... | ...... | ...... | ...... | ...... | ...... |
| 350 | FLD | QQ | QQ15 | 1000 | Q20-20000 | 5 |
| 351 | FLD | QQ | QQ15 | 1020 | Q20-20001 | 5 |

FIG. 4

602 : RAID GROUP MANAGEMENT INFORMATION

| RAID GROUP ID | STORAGE MEDIUM LIST | RAID LEVEL | CAPACITY |
|---|---|---|---|
| 2 | 312,313,360,361 | 5 | 600GB |
| 3 | 314,315,370,371 | 5 | 400GB |
| 5 | 350,351,352,353 | 1 | 300GB |
| ... | ... | ... | ... |
| 20 | 380,381,382,383 | 1 | 300GB |

FIG. 5

603 : VOLUME MANAGEMENT INFORMATION

| VOLUME ID | RAID GROUP ID | RAID GROUP STARTING ADDRESS | SIZE |
|---|---|---|---|
| 20001 | 2 | 0 | 100GB |
| 20002 | 2 | 100,000,000,000 | 100GB |
| 20003 | 2 | 200,000,000,000 | 100GB |
| ... | ... | ... | ... |
| 30001 | 3 | 0 | 100GB |
| 30002 | 3 | 100,000,000,000 | 100GB |

FIG. 7

701 : DISK ARRAY INFORMATION

| DISK ARRAY ID | CONNECTION INFORMATION |
|---|---|
| 300 | 10.100.100.100 |
| 10301 | 10.100.100.101 |
| ⋮ | ⋮ |

FIG. 8

702 : VOLUME INFORMATION

| DISK ARRAY ID | VOLUME ID | RAID GROUP ID | SIZE |
|---|---|---|---|
| 300 | 20001 | 2 | 100GB |
| 300 | 20002 | 2 | 100GB |
| 300 | 20003 | 2 | 100GB |
| ⋮ | ⋮ | ⋮ | ⋮ |
| 300 | 30001 | 3 | 100GB |
| 300 | 30002 | 3 | 100GB |
| ⋮ | ⋮ | ⋮ | ⋮ |
| 10301 | 1 | 10 | 200GB |
| 10301 | 1 | 11 | 200GB |

FIG. 9

703: STORAGE MEDIUM SPECIFICATION INFORMATION

| TYPE | VENDOR | MODEL | REVISION | DATA TRANSFER SPEED DURING READING | DATA TRANSFER SPEED DURING WRITING | AVERAGE ACCESS TIME |
|---|---|---|---|---|---|---|
| HDD | HG | UL15 | 0010 | 80MB/s | 60MB/s | 8ms |
| HDD | HG | UL15 | 0100 | 81MB/s | 61MB/s | 8ms |
| ...... | ...... | ...... | ...... | ...... | ...... | ...... |
| FLD | EL | EL15 | 0010 | 70MB/s | 20MB/s | 0.1ms |
| FLD | EL | EL15 | 0120 | 71MB/s | 20MB/s | 0.1ms |
| ...... | ...... | ...... | ...... | ...... | ...... | ...... |
| FLD | QQ | QQ15 | 1000 | 50MB/s | 10MB/s | 0.1ms |
| FLD | QQ | QQ15 | 1020 | 51MB/s | 10MB/s | 0.1ms |

FIG. 10

704 : STORAGE MEDIUM PACKAGING INFORMATION

| DISK ARRAY ID | STORAGE MEDIUM ID | RAID GROUP ID | TYPE | VENDOR | MODEL | REVISION | SERIAL NUMBER |
|---|---|---|---|---|---|---|---|
| 300 | 312 | 2 | HDD | HG | UL15 | 0010 | H0010-0010 |
| 300 | 313 | 2 | HDD | HG | UL15 | 0100 | H0010-0200 |
| ...... | ...... | ...... | ...... | ...... | ...... | ...... | ...... |
| 300 | 314 | 3 | FLD | EL | EL15 | 0010 | E0010-0001 |
| 300 | 315 | 3 | FLD | EL | EL15 | 0120 | E0120-0010 |
| ...... | ...... | ...... | ...... | ...... | ...... | ...... | ...... |
| 300 | 350 | 5 | FLD | QQ | QQ15 | 1000 | Q20-20000 |
| 300 | 351 | 5 | FLD | QQ | QQ15 | 1020 | Q20-20001 |

FIG. 13

705 : VOLUME INFORMATION

| DISK ARRAY ID | VOLUME ID | RAID GROUP ID | SIZE | USED/UNUSED |
|---|---|---|---|---|
| 300 | 20001 | 2 | 100GB | 1 |
| 300 | 20002 | 2 | 100GB | 1 |
| 300 | 20003 | 2 | 100GB | 1 |
| ⋮ | ⋮ | ⋮ | ⋮ | |
| 300 | 30001 | 3 | 100GB | 0 |
| 300 | 30002 | 3 | 100GB | 0 |
| ⋮ | ⋮ | ⋮ | ⋮ | |
| 10301 | 1 | 10 | 200GB | 1 |
| 10301 | 1 | 11 | 200GB | 1 |

METHOD AND COMPUTER FOR DETERMINING STORAGE DEVICE

CROSS-REFERENCE TO PRIOR APPLICATION

This application relates to and claims the benefit of priority from Japanese Patent Application number 2007-120614, filed on May 1, 2007, the entire disclosure of which is incorporated herein by reference.

BACKGROUND

The present invention generally relates to a technique for determining a storage device in a storage system.

In a financial institution or the like, for example, a large-scale storage system storing a vast amount of data ranging from several tens of terabytes to several tens of petabytes is employed. A disk array device employs a RAID (Redundant Array of Inexpensive Disks) is typically used as this type of storage system. A disk array device is capable of accommodating a plurality of storage media (between several hundred and several thousand storage media, for example).

Examples of storage medium types include a hard disk drive and a flash drive, for example. A flash drive is used to hold data in flash memory, but has an identical data input/output interface to that of a hard disk drive. Hence, a flash drive is interchangeable with a hard disk drive.

The performance of a storage medium varies according to the type and product model. As regards the storage medium type, for example, when a hard disk drive is compared to a flash drive, the data transfer speed during sequential access in a hard disk drive is greater than that of a flash drive. Depending on the product, however, this may not apply. More specifically, according to certain benchmarks, for example, a flash drive may have a data transfer performance that is comparable to sequential writing in a hard disk drive up to an I/O size (data transfer amount per I/O) of several kilobytes.

U.S. Pat. No. 5,920,884 discloses a method of increasing the speed of I/O processing by accessing flash memory components concurrently.

The power consumption of a flash drive is smaller than that of a hard disk drive, and it is therefore advantageous to use a flash drive as a data backup destination. U.S. Pat. No. 5,920,884 proposes a method of accessing flash memory components concurrently on the premise that access to a flash memory is slow. This premise is usually considered valid.

However, as described above, the performance of a flash drive is not always inferior to the performance of a hard disk drive. For example, with a configuration such as that of the method described in U.S. Pat. No. 5,920,884, in which a large number of flash drives are simply accessed concurrently, cases in which a high level of performance is not achieved may occur. An example of such a case is data copying executed using a copy function possessed by a disk array device. Data copying may take the form of copying performed within a single disk array device (so-called local copying) or copying performed from one disk array device to another disk array device (so-called remote copying), but in both cases it is considered difficult to achieve a sufficient level of reading performance in the copy source simply by employing the technique disclosed in U.S. Pat. No. 5,920,884.

The problem described above is not limited to a disk array device, and may exist similarly in other types of storage system.

Furthermore, in the case of copying, a copy source storage device may be set as a first storage device and a copy destination storage device may be set as a second storage device, but in other cases where the first storage device and second storage device are related, problems may occur even when it is possible to apply the technique disclosed in U.S. Pat. No. 5,920,884.

SUMMARY

It is therefore an object of the present invention to determine an appropriate second storage device that is related to a first storage device.

Other objects of the present invention will become clear from the following description.

Storage medium performance information indicating the storage medium access performance of various storage media is prepared in advance. A computer specifies the configuration of a first storage device by referencing first configuration information relating to the configuration of a first storage system comprising the first storage device. Further, the computer specifies one or more storage medium access performances corresponding respectively to one or more storage media constituting the first storage device by referencing the storage medium performance information, and calculates a first storage device access performance index of the first storage device on the basis of the one or more specified storage medium access performances. The computer then references second configuration information relating to the configuration of a second storage system comprising a second storage device and the storage medium performance information, and determines a second storage device having a storage device access performance index that is equal to or greater than a second storage device access performance index determined on the basis of the calculated first storage device access performance index.

BRIEF DESCRIPTION OF THE DRAWINGS

FIG. 3 is a view showing an example of the configuration of storage medium management information;

FIG. 4 is a view showing an example of the configuration of RAID group management information;

FIG. 5 is a view showing an example of the configuration of volume management information;

FIG. 7 is a view showing an example of the configuration of disk array information;

FIG. 8 is a view showing an example of the configuration of volume information;

FIG. 9 is a view showing an example of the configuration of storage medium specification information;

FIG. 10 is a view showing an example of the configuration of storage medium packaging information;

FIG. 13 is a view showing an example of the configuration of volume information according to a second embodiment of the present invention;

DETAILED DESCRIPTION OF THE PREFERRED EMBODIMENTS

Figure 1:
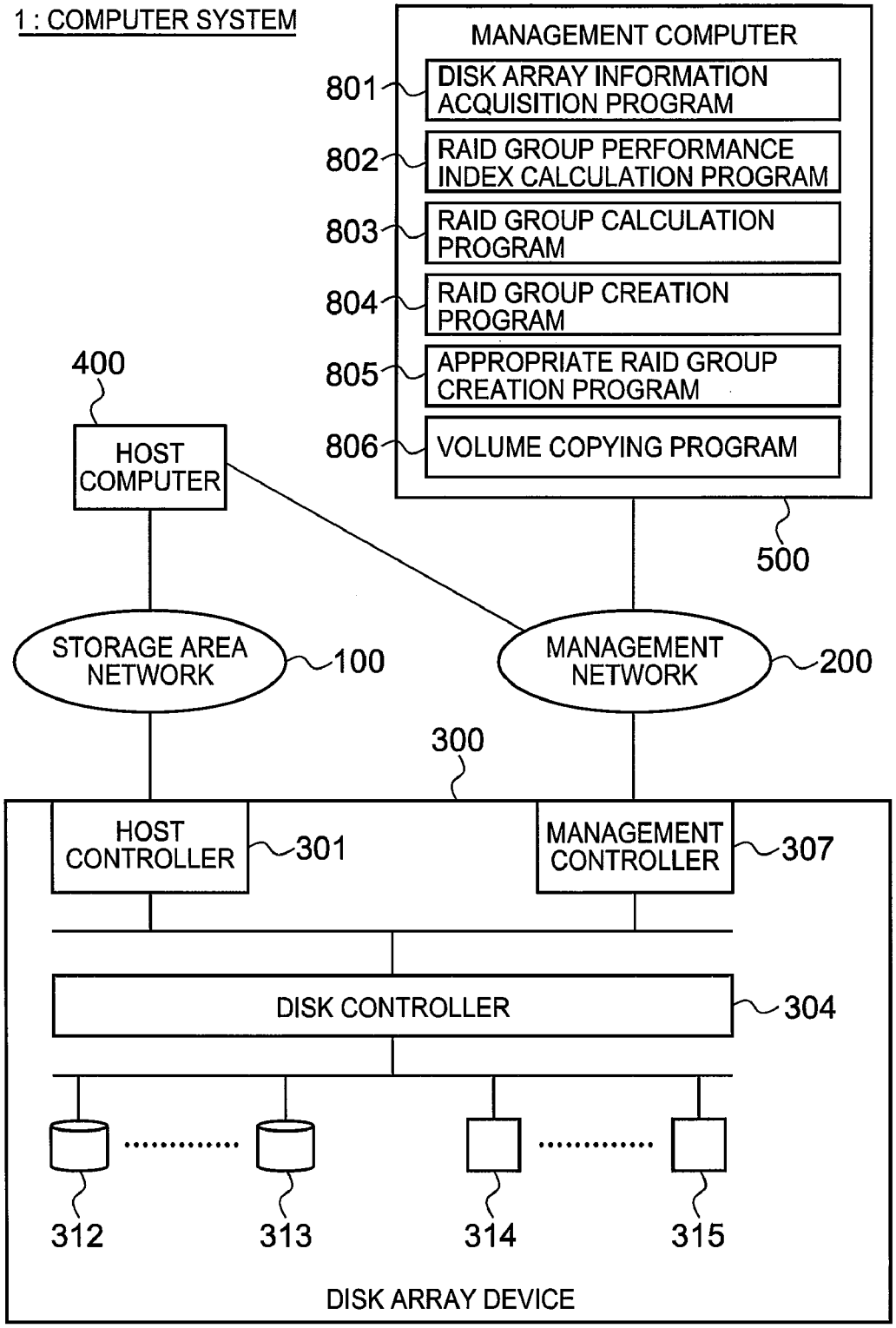
FIG. 1 is a view showing an example of the configuration of a computer system.

In one embodiment, a computer comprises a performance calculation unit and a second storage device determination unit. The performance calculation unit is capable of specifying the configuration of a first storage device by referencing first configuration information relating to the configuration of a first storage system comprising the first storage device, specifying one or more storage medium access performances corresponding respectively to one or more storage media constituting the first storage device by referencing storage medium performance information indicating the storage medium access performance of each storage medium, and calculating a first storage device access performance index of the first storage device on the basis of the one or more specified storage medium access performances. The second storage device determination unit is capable of determining a second storage device having a storage device access performance index that is equal to or greater than a second storage device access performance index determined on the basis of the calculated first storage device access performance index by referencing second configuration information relating to the configuration of a second storage system comprising the second storage device and the storage medium performance information.

The first storage system and second storage system may be identical. In other words, the second storage device may be provided in a storage system comprising the first storage device.

Further, for example, "determining the second storage device" may mean calculating the configuration of the second storage device or selecting a storage device to serve as the second storage device from among a plurality of storage devices.

In one embodiment, the first storage device is a copy source storage device. The second storage device is a copy destination storage device. The first storage device access performance index is a copy source reading performance index, which is an index of the reading performance of the copy source storage device The second storage device access performance index is a copy destination writing performance index, which is an index of the writing performance of the copy destination storage device. The copy destination writing performance index, which is determined on the basis of the calculated copy source reading performance index, exceeds the copy source reading performance index.

In one embodiment, the copy source storage device is a restoration source storage device. The copy destination storage device is a restoration destination storage device.

In one embodiment, the copy source storage device is a backup source storage device when backup is performed, and a restoration destination storage device when restoration is performed. The copy destination storage device is a backup destination storage device when backup is performed, and a restoration source storage device when restoration is performed. The first storage device access performance index is a copy source reading performance index, which is an index of the reading performance of the copy source storage device, and a copy source writing performance index, which is an index of the writing performance of the copy source storage device. The second storage device access performance index is a copy destination writing performance index, which is an index of the writing performance of the copy destination storage device, and a copy destination reading performance index, which is an index of the reading performance of the copy destination storage device. The copy destination writing performance index, which is determined on the basis of the calculated copy source reading performance index, exceeds the copy source reading performance index, and the copy destination reading performance index, which is determined on the basis of the calculated copy source writing performance index, is lower than the copy source writing performance index.

In one embodiment, the storage medium access performance is a data transfer speed during sequential writing and a data transfer speed during sequential reading.

In one embodiment, the storage medium access performance is an average access time. The copy destination writing performance index exceeds the copy source reading performance index such that a value calculated on the basis of the average access time relating to the copy destination is smaller than a value calculated on the basis of the average access time relating to the copy source.

In one embodiment, the storage medium access performance is the data transfer speed during sequential writing, the data transfer speed during sequential reading, and the average access time. When an access classification parameter is received and the access classification parameter indicates sequential access, the performance calculation unit and the second storage device determination unit can employ the data transfer speed during sequential writing and the data transfer speed during sequential reading, and when the access classification parameter indicates random access, the performance calculation unit and the second storage device determination unit can employ the average access time.

In one embodiment, the computer further comprises a RAID group creation unit. The storage device is a RAID group constituted by two or more storage media. The first configuration information indicates the configuration of each of one or more RAID groups provided in the first storage system. The second configuration information denotes the storage media provided in the second storage system. The configuration of the RAID group includes the storage media provided in the RAID group and the RAID level thereof. In other words, the configuration of the RAID group denotes that the RAID group is configured which the storage media and has which a RAID level. The performance calculation unit is capable of calculating a first RAID group access performance index of the first RAID group on the basis of one or more storage medium access performances corresponding respectively to the one or more storage media constituting the first RAID group, and the RAID level of the first RAID group. The second storage device determination unit is capable of calculating the configuration of a second RAID group having a RAID group access performance index that is equal to or greater than a second RAID group access performance index determined on the basis of the calculated first RAID group access performance index. The RAID group creation unit is capable of creating a second RAID group having the calculated configuration in the second storage system.

In one embodiment, the storage media serving as configuration elements of the second RAID group are storage media that have not been selected by the second storage device determination unit to serve as configuration elements of another RAID group in the second storage system, and have a higher storage medium access performance than other unselected storage media.

In one embodiment, the number of storage media serving as configuration elements of the second RAID group is set by the second storage device determination unit on the basis of the RAID level of the second RAID group and the storage medium access performances of the storage media serving as configuration elements at a number having a RAID group access performance index that is equal to or greater than the second RAID group access performance index determined on the basis of the calculated first RAID group access performance index.

In one embodiment, the computer further comprises a volume preparation unit. The storage device is a logical volume provided in a RAID group constituted by two or more storage media. The first configuration information and second configuration information respectively denote the configurations of the one or more RAID groups and the size of the logical volume in each RAID group. The configuration of the RAID group includes the storage media provided in the RAID group and the RAID level thereof. The performance calculation unit is capable of calculating a first RAID group access performance index of a first RAID group as a first volume access performance index of a first logical volume on the basis of one or more storage medium access performances corresponding respectively to the one or more storage media constituting the first RAID group having the first logical volume, and the RAID level of the first RAID group. The second storage device determination unit is capable of determining a second logical volume having a volume access performance index that is equal to or greater than a second volume access performance index determined on the basis of the calculated first volume access performance index. The volume preparation unit is capable of preparing the determined second logical volume in the second storage system.

In one embodiment, the determined second logical volume is prepared on a second RAID group having a RAID group access performance index that is equal to or greater than the second RAID group access performance index determined on the basis of the calculated first RAID group access performance index.

In one embodiment, the determined second logical volume is a single logical volume obtained by coupling together a plurality of logical volumes. The plurality of logical volumes exist in two or more RAID groups. A total RAID group access performance index of the two or more RAID groups is a volume access performance index that is equal to or greater than the second volume access performance index determined on the basis of the calculated first volume access performance index.

In one embodiment, when an available size equal to or greater than the size of the second logical volume does not exist, or when an unused logical volume having a size that is equal to or greater than the size of the second logical volume does not exist in the second RAID group having a RAID group access performance index that is equal to or greater than the second RAID group access performance index determined on the basis of the calculated first RAID group access performance index, the second logical volume is set as a single logical volume obtained by coupling together a plurality of logical volumes.

In one embodiment, a storage medium access performance corresponding to a plurality of storage medium attributes of the storage media is recorded in the storage medium performance information.

Two or more of the plurality of embodiments described above may be combined. Further, each of the units described above (for example, the performance calculation unit and second storage device determination unit) may be configured using hardware, a computer program, or a combination thereof (the combination being realized partly by a computer program and partly by hardware, for example). The computer program is read and executed by a predetermined processor. Further, during information processing performed when the computer program is read by the processor, a storage area existing on a hardware resource such as memory may be used in an appropriate manner. Furthermore, the computer program may be installed on a computer from a recording medium such as a CD-ROM, or downloaded onto a computer via a communication network.

Several embodiments of the present invention will now be described in detail with reference to the drawings.

First Embodiment (Overall Configuration)

FIG. 1 shows an example of the configuration of a computer system 1 according to a first embodiment of the present invention.

A host computer 400 and a disk array device 300 are connected to a storage area network (SAN) 100. Further, the disk array device 300, the host computer 400, and a management computer 500 are connected to a management network 200. To facilitate description in this embodiment, it is assumed that the disk array device, computer, SAN, management network, and management computer are each provided singly, but at least one of these components may be provided in a plurality.

(SAN 100)

As described above, the disk array device 300 and host computer 400 are connected via the SAN 100. The SAN 100 is a network enabling mutual communication between connected devices such as the disk array device 300 and host computer 400. An FC (Fibre Channel), Ethernet (registered trademark), or another transmission medium and bridging device may be used to construct the SAN 100. Further, the fibre channel protocol (FCP), TCP/IP, iSCSI, or another protocol may be used for inter-device communication. Furthermore, the SAN 100 may be constituted by a combination of a plurality of transmission media, bridging devices, and protocols. For example, a storage network in which FCP and iSCSI coexist may be configured using a bridging device that alternates between iSCSI and FCP protocols. Another type of communication network, for example a virtual private network (VPN) in which communication is performed via the Internet or another wide area network, or a network including a virtual private network, may be employed instead of the SAN 100.

(Management Network 200)

The management network 200 is a network used to manage devices constituting the computer system 1, and is constituted by a LAN (Local Area Network), for example. The devices connected to the management network 200 are capable of communicating with each other. The SAN 100 and the management network 200 may be an identical communication network. Further, the management network 200 may be a virtual private network (VPN) in which communication is performed via the Internet or another wide area network, or a network including a virtual private network.

The management computer 500 will be described in detail below with reference to FIG. 6. The disk array device 300 will now be described in detail with reference to FIG. 2.

(Disk Array Device 300)

Figure 2:
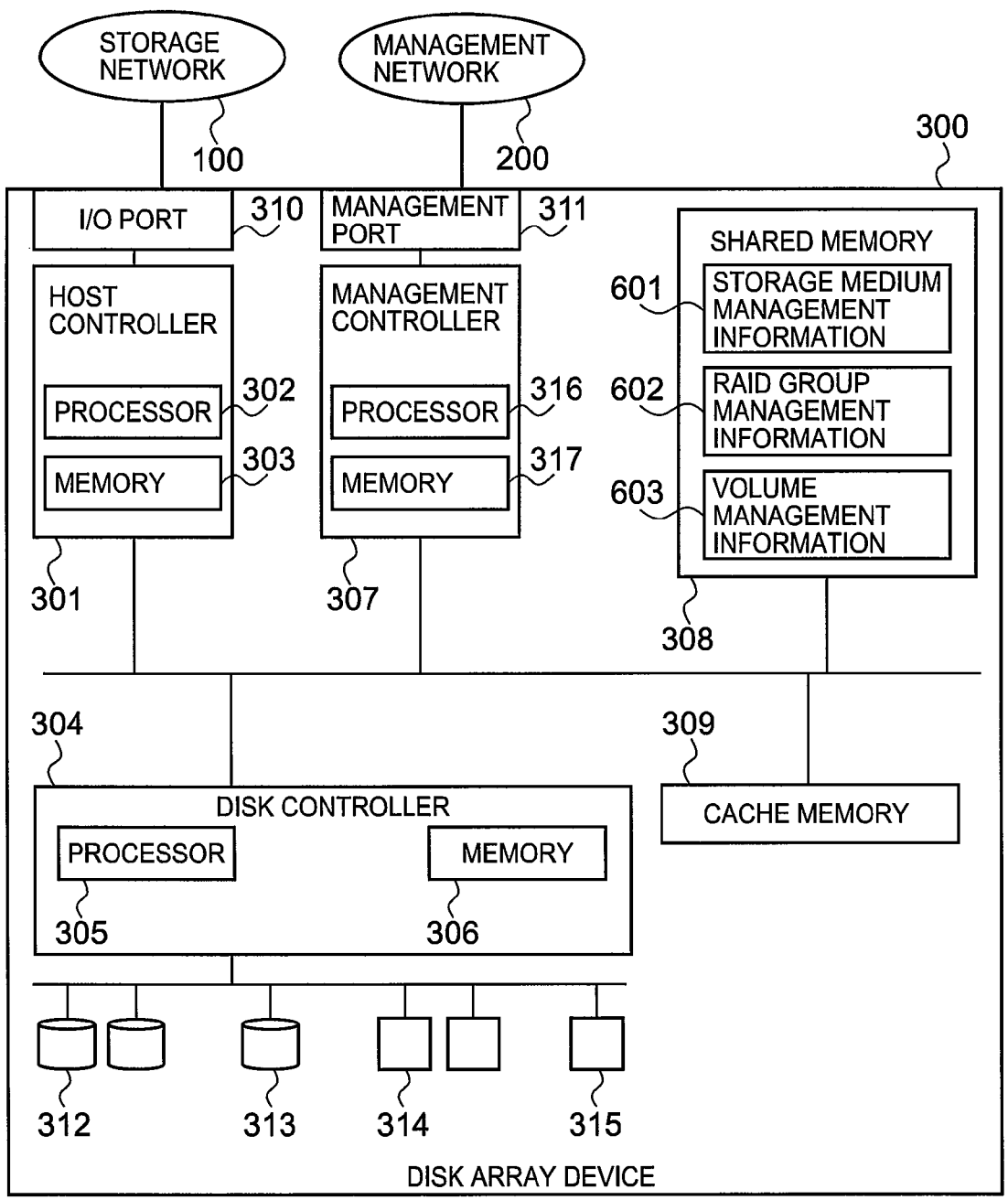
FIG. 2 is a view showing an example of the configuration of a disk array device.

FIG. 2 is a view showing a detailed example of the configuration of the disk array device 300.

The disk array device 300 is a storage system capable of accommodating between several hundred and several thousand storage media, for example, and has a storage capacity of several hundred terabytes. A RAID is a method of protecting data from data loss due to a fault in a storage medium. The basic principle of data protection using a RAID is that data and data for correcting an error in the data (to be referred to hereafter as "redundant data" for convenience) are recorded so as to be spread over a plurality of storage media, and therefore, when a fault occurs in one of the storage media, the data can be restored from the remaining storage media. In a RAID, there are several methods for storing data and redundant data in storage media. For example, RAID1, RAID5, RAID6, and so on are widely used as RAID levels. By dividing the installed storage media into groups of several media each and applying a RAID to each group, data can be protected. In the following description, a group of storage media constituting a RAID will be referred to as a "RAID group".

A RAID group may be dealt with as a single storage area that can be accessed continuously by specifying a block address. A storage area formed in this manner will be referred to in the following description as a "logical volume". Depending on the disk array device, the storage area of a RAID group may be divided further into a plurality of storage areas that are dealt with respectively as individual logical volumes. The host computer 400 connected to the disk array device 300 recognizes a logical volume as a logical unit (LU) according to SCSI (Small Computer System Interface) standards, for example, and is capable of performing data writing and reading to and from the logical volume.

The disk array device 300 comprises a host controller 301, a disk controller 304, a management controller 307, shared memory 308, cache memory 309, an I/O port 310, a management port 311, a plurality of hard disk drives 312 to 313, and a plurality of flash drives 314 to 315.

(Host Controller 301)

The host controller 301 is a control device for processing an I/O request from the host computer 400. The host controller 301 comprises a processor (a CPU, for example) 302 and memory 303. The processor 302 is capable of reading and writing data to and from the memory 303, the shared memory 308, and the cache memory 309, and executing programs stored in these memories. The host controller 301 may be provided in the disk array device 300 in a plurality.

(Disk Controller 304)

The disk controller 304 is a control device for controlling data reading and writing to and from the hard disk drives 312 to 313 and flash drives 314 to 315. Similarly to the host controller 301, the disk controller 304 comprises a processor 305 and memory 306. The processor 305 is capable of reading and writing data to and from the memory 306, the shared memory 308, and the cache memory 309, and executing programs stored in these memories. The host controller 301 places a request with the disk controller 304 for data recording, reading, or writing in response to an I/O request transmitted from the host computer 400, whereupon the disk controller 401 reads data from the hard disk drives 312 to 313 and/or the flash drives 314 to 315 or writes data to the hard disk drives 312 to 313 and/or the flash drives 314 to 315 in response to the request from the host controller 301. The disk controller 304 may be provided in the disk array device 300 in a plurality. Further, a controller functioning as both a host controller and a disk controller may be provided in place of the host controller 301 and disk controller 304.

(Shared Memory 308)

The shared memory 308 stores configuration information and management information relating to the disk array device 300. The shared memory 308 is connected to enable access from the host controller 301, disk controller 304, and management controller 307. More specifically, for example, the shared memory 308, cache memory 309, host controller 301, management controller 307, and disk controller 304 are connected via a medium such as a switch (a crossbar switch, for example) or a bus. The shared memory 308 may be packaged in one or both of the host controller 301 and disk controller 304.

(Cache Memory 309)

The cache memory 309 is memory used to transfer data between the host controller 301 and disk controller 304. The cache memory 309 is also used as a cache storage area for processing an access request from the host computer 400 at high speed (with a short response time) (more specifically, as a storage area in which data exchanged between the host controller 301 and disk controller 304 are stored temporarily). The cache memory 309 may be packaged in one or both of the host controller 301 and disk controller 304. Further, the cache memory 309 and shared memory 308 may be constituted by a single memory.

(I/O Port 310)

The I/O port 310 is a connection port for connecting the disk array device 300 to the SAN 100. The host controller 301 receives an I/O request from the host computer 400 through the I/O port 310. The disk array device 300 may comprise a plurality of I/O ports.

(Management Port 311)

The management port 311 is a connection port for connecting the management controller 307 to the management network 200. The management computer 500 is capable of communicating with the management controller 307 through the management port.

(Management Controller 307)

The management controller 307 is a control device that provides the management computer 500 with a function for managing the disk array device 300 by means of network communication. The management computer 500 communicates with the management controller 307 via the management network 200, and places a request with the management controller 307 for management of the disk array device 300. Examples of this request include the acquisition of I/O statistical information, security setting modification, and RAID group and volume configuration modification. The management controller 307 may include the functions of one or both of the host controller 301 and the disk controller 304.

(Hard Disk Drives 312 to 313, and Flash Drives 314 to 315)

The hard disk drives 312 to 313 and flash drives 314 to 315 are used as storage media. A RAID group is configured using two or more of the hard disk drives 312 to 313. Similarly, a RAID group is configured using two or more of the flash drives 314 to 315. A plurality of RAID groups exist in the disk array device 300. One or more logical volumes are formed on the basis of the storage space of a single RAID group. Accordingly, a plurality of logical volumes are provided in the disk array device 300. As noted above, the configuration of the RAID group and the RAID groups used to form each logical volume are controlled from the management computer 500.

(Examples of Information Stored in Shared Memory)

Storage medium management information 601, RAID group management information 602, and volume management information 603 are stored in the shared memory 308. This information will now be described.

FIG. 3 shows an example of the configuration of the storage medium management information 601.

The storage medium management information 601 is information relating to all of the storage media provided in the disk array device 300. The storage medium management information 601 is a table, for example, and each row of the table corresponds to a storage medium. On each row, a storage medium ID, a type, a vendor, a model, a revision, a serial number, and a RAID group ID, for example, are recorded as information elements relating to a single storage medium (to be referred to hereafter as a "subject storage medium" during description referencing FIG. 3).

The storage medium ID is an information element for identifying the subject storage medium in the disk array device 300.

The type is an information element for identifying the type of the subject storage medium. In the case of a hard disk drive, "HDD" is recorded as the type, and in the case of a flash drive, "FLD" is recorded as the type.

The vendor is an information element for identifying the vendor corporation in which the subject storage medium was manufactured.

The model is an information element for identifying the model of the subject storage medium.

The revision is an information element for identifying the revision (revision number) of the subject storage medium.

The serial number is an information element for identifying the manufacturing number (individual identification number) of the subject storage medium.

The RAID group ID is an information element for identifying the RAID group, which takes the form of an identifier allocated to a RAID group in the disk array device 300. When the subject storage medium is not a configuration element of a RAID group, a RAID group ID corresponding to the subject storage medium does not exist (for example, a blank or an invalid value is recorded in the storage medium management information 601).

FIG. 4 shows an example of the configuration of the RAID group management information 602.

The RAID group management information 602 is information relating to all of the RAID groups provided in the disk array device 300. The RAID group management information 602 is a table, for example, and each row of the table corresponds to a RAID group. On each row, a RAID group ID, a storage medium list, a RAID level, and a capacity are recorded as information elements relating to a single RAID group (to be referred to hereafter as a "subject RAID group" during description referencing FIG. 4).

The storage medium list is a set of storage medium IDs corresponding to the storage media constituting the subject RAID group.

The RAID level is information indicating the RAID level of the subject RAID group.

The capacity is the storage capacity of the logical volumes that can be provided in the subject RAID group, or in other words the overall storage capacity of the subject RAID group. The storage area of a storage medium such as a hard disk drive or a flash drive is divided into logical blocks of 512 to 4096 bytes, for example, and I/O is performed in units of these blocks. A unique number is allocated to each block, and when I/O is performed to or from the storage medium, the block to be subjected to I/O is specified by this number. This block number will be referred to as a logical block address, or an LBA, hereafter. It is assumed that the I/O interface of the flash drive is identical to that of the hard disk drive. The storage area of the RAID group is managed in a similar manner to the hard disk drive, i.e. using logical block addresses.

FIG. 5 shows an example of the configuration of the volume management information 603.

The volume management information 603 is information relating to all of the logical volumes provided in the disk array device 300. The volume management information 603 is a table, for example, and each row corresponds to a logical volume. On each row, a volume ID, a RAID group ID, a RAID group starting address, and a size are recorded as information elements relating to a single logical volume (to be referred to hereafter as a "subject logical volume" during description referencing FIG. 5).

The volume ID is an information element for identifying a subject logical volume in the disk array device 300.

The RAID group starting address is a logical block address at the head of the storage area of the RAID group comprising the subject logical volume. The logical volume is configured as a single logical block address range within a RAID group. Therefore, the RAID group starting address is an information element indicating the logical block address from which the subject logical volume begins in the storage area of the RAID group.

The size is a logical block number indicating the size of the storage area of the subject logical volume. Upon reception of an I/O request from the host computer 400, the host controller 301 writes the data included in the I/O request to the cache memory 309, and places a request with the disk controller 304 for data writing. Upon reception of the request from the host controller 301, the disk controller 304 specifies the storage medium comprising the subject logical volume to which the data are to be written by referencing the volume management information 603 and RAID group management information 602, and writes the data stored in the cache memory 309 in the specified storage medium.

(Management Computer)

Figure 6:
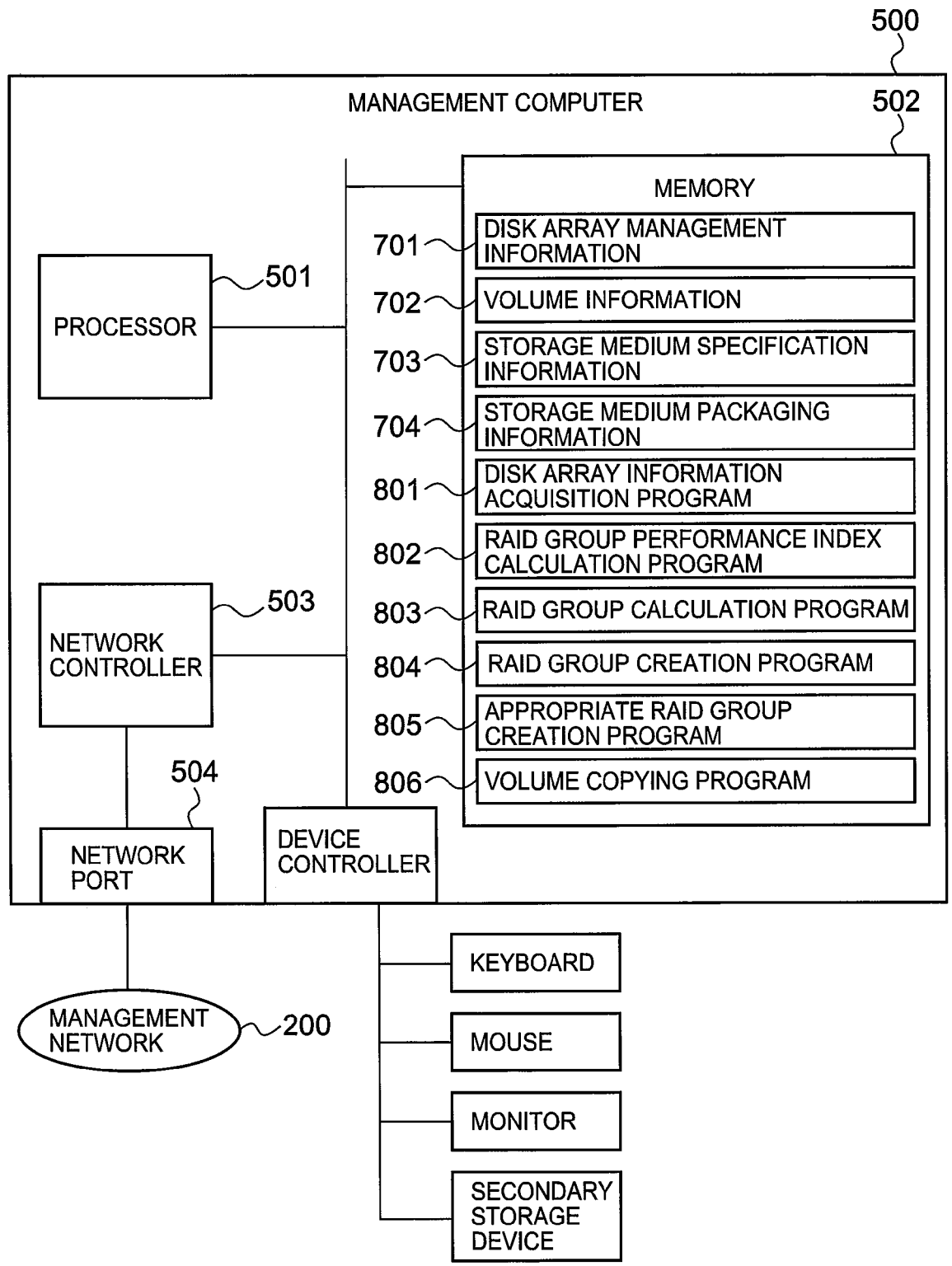
FIG. 6 shows an example of the configuration of a management computer according to a first embodiment of the present invention.

FIG. 6 shows an example of the configuration of the management computer 500.

The management computer 500 is a computer such as a personal computer, a general-purpose computer, a workstation, or a PDA (Personal Digital Assistant), for example.

The management computer 500 comprises a processor (a CPU, for example) 501, memory 502, a network controller 503, and a network port 504. Further, an input device such as a keyboard or mouse, an output device such as a monitor, and a secondary storage device are connected to the management computer 500. Through the input device, a user of the management computer 500 can instruct the management computer 500 to execute a program or control a device.

The processor 501 is connected to the memory 502, network controller 503, and other devices.

The network controller 503 comprises the network port 504. The network port 504 is a connection port for connecting the management computer 500 to the management network 200. The management computer 500 is connected to the management network 200 via the network port 504.

The processor 501 reads and writes data to and from the memory 502, and executes programs stored in the memory 502. The processor 501 is also capable of controlling the network controller 503 and other devices that are connected to the processor.

The management computer 500 may function to manage not only the disk array device 300, but also the other devices provided in the computer system 1 and devices of another computer system. Further, the management computer 500 may execute an application program in a similar manner to the host computer 400.

(Information Managed by Management Computer)

Disk array information 701, which is a list of disk array devices subject to management by the management computer 500, volume information 702, which is a list of logical volumes provided in the disk array devices, storage medium specification information 703, which is information relating to the specifications of each storage medium model, and storage medium packaging information 704, which is a list of storage media packaged in the disk array devices, are stored in the memory 502 of the management computer 500, for example. This information will now be described in detail.

FIG. 7 shows an example of the configuration of the disk array information 701.

The disk array information 701 is a table, for example, and each row corresponds to an individual disk array device subject to management by the management computer 500. On each row, a disk array ID and connection information are recorded as information elements relating to a single disk array device (to be referred to hereafter as a "subject disk array device" during description referencing FIG. 7).

The disk array ID is an information element for uniquely identifying the subject disk array device in the computer system 1.

The connection information is an information element used by the management computer 500 for data communication with the subject disk array device. The connection information includes an IP address allocated to the management port 311 of the subject disk array device and so on, for example.

Various information elements relating to the disk array device 300 shown in FIG. 1 are stored on the first row of the disk array information 701 (in other words, in the description of the first embodiment, the reference numeral "300" of the "disk array device 300" corresponds to the disk array ID "300"). The user may input the disk array information 701 by operating the management computer 500.

FIG. 8 shows an example of the configuration of the volume information 702.

The volume information 702 is a table, for example, and each row corresponds to a logical volume. On each row, the disk array ID, a volume ID, a RAID group ID, and a size are recorded as information elements relating to a single logical volume (to be referred to hereafter as a "subject logical volume" during description referencing FIG. 8).

The disk array ID is information identifying the disk array device comprising the subject logical volume. The value thereof is equal to the information stored in the disk array ID of the disk array information 701.

The volume ID is an information element for identifying the subject logical volume in the disk array device comprising the subject logical volume.

The RAID group ID is an information element for identifying the RAID group comprising the subject logical volume.

The size is the size of the data that can be recorded in the subject logical volume, or in other words the storage size of the subject logical volume. Note that in the description of the first embodiment, the overall storage capacity of a RAID group is referred to as the "capacity", whereas the storage capacity of a logical volume is referred to as the "size".

FIG. 9 shows an example of the configuration of the storage medium specification information 703.

The storage medium specification information 703 is a table, for example, and each row corresponds to a storage medium product. Here, the term "storage medium product" denotes a storage medium identified uniquely by four information elements, namely type, vendor, model, and revision, and does not denote a storage medium identified uniquely by the aforementioned storage medium ID. For example, when two or more storage media specified by two or more storage medium IDs have the same type, vendor, model, and revision, they are considered to be an identical storage medium product. On each row of the storage medium specification information 703, the type, vendor, model, revision, data transfer speed during reading, data transfer speed during writing, and average access time are recorded as information elements relating to a single storage medium product (to be referred to hereafter as a "subject storage medium product" during description referencing FIG. 9).

The type, vendor, model, and revision are as described with reference to FIG. 3.

The data transfer speed during reading is a data transfer amount that can be read from the subject storage medium product per unit time. The value thereof may be a performance measured when the disk controller 304 actually reads data from the subject storage medium product, or may be defined by the user. The value thereof may also be provided by the manufacturer (vendor) of the subject storage medium product.

The data transfer speed during writing is a data transfer amount that can be written to the subject storage medium product per unit time. The value thereof may be a performance measured when the disk controller 304 actually writes data to the subject storage medium product, or may be defined by the user. The value thereof may also be provided by the manufacturer (vendor) of the subject storage medium product.

The average access time is the average time (in seconds) of an overhead occurring when data are read from the subject storage medium product or when data are written to the subject storage medium product. In the case of a hard disk drive, for example, the overhead includes the movement time of a magnetic head (the seek time), the time required to move a target sector below the magnetic head (the search time), and so on. The value thereof may be provided by the vendor. Further, different average access times may be recorded in the storage medium specification information 703 in relation to data writing and data reading.

FIG. 10 shows an example of the configuration of the storage medium packaging information 704.

The storage medium packaging information 704 is a table, for example, and each row corresponds to a storage medium. On each row, the disk array ID, storage medium ID, RAID group ID, type, vendor, model, revision, and serial number, for example, are recorded as information elements relating to a single storage medium (to be referred to hereafter as a "subject storage medium" during description referencing FIG. 10).

The disk array ID is the ID of the disk array device comprising the subject storage medium.

The storage medium ID is the ID of the subject storage medium in the disk array device.

The RAID group ID is an ID of the RAID group having the subject storage medium as a configuration element in the disk array device. When the subject storage medium is not used in any of the RAID groups, a value indicating that the storage medium is unused is recorded in the RAID group ID (or the corresponding row is left blank).

The type, vendor, model, revision, and serial number are information elements for identifying the storage medium, similarly to the storage medium management information 601 described with reference to FIG. 3.

(Programs Executed by Management Computer)

A disk array information acquisition program 801, a RAID group performance index calculation program 802, a RAID group calculation program 803, a RAID group creation program 804, an appropriate RAID group creation program 805, and a volume copying program 806 are stored in the memory 502 of the management computer 500 as computer programs executed by the management computer 500, for example. Hereafter, when a computer program is used as the subject of a sentence, it is assumed that in actuality, processing is performed by the processor 501 that executes the computer program.

The disk array information acquisition program 801 is a program for obtaining the management information (more specifically, the storage medium management information 601, RAID group management information 602, and volume management information 603) held by each disk array device from each disk array device, and storing the obtained management information in the memory 502. The information obtained from the disk array devices by the disk array information acquisition program 801 may be included in the disk array information 701, volume information 702, storage medium specification information 703, and storage medium packaging information 704. The disk array information acquisition program 801 communicates with the disk array device 300 via the management network 200, and is capable of obtaining the management information described above from the disk array device 300.

The RAID group performance index calculation program 802 is a program for estimating a maximum reading performance and a maximum writing performance during sequential access in relation to each of the RAID groups provided in the disk array device.

The RAID group calculation program 803 is a program for calculating the configuration of a RAID group conforming to a specified performance. The RAID group configuration indicates the storage media constituting the RAID group, the number of storage media, and the RAID level. This program 803 is capable of using the information obtained from the disk array device 300 by the disk array information acquisition program 801 and the storage medium specification information 703 to calculate and output the configuration of a RAID group conforming to provided parameters.

The RAID group creation program 804 is a program for instructing the disk array device to create a RAID group.

The appropriate RAID group creation program 805 is a program for creating a RAID group conforming to the performance as a copy destination of the specified RAID group.

The volume copying program 806 is a program for copying a specified volume or RAID group to a specified copy destination volume or RAID group.

Flow of Processing Performed in First Embodiment

The flow of the processing performed in the first embodiment will now be described.

First, the disk array management information 701, volume information 702, storage medium specification information 703, and storage medium packaging information 704 are stored in the memory 502 of the management computer 500. These four types of information may be input by the user of the management computer 500 (for example, a manager) or input by the disk array information acquisition program 801. For example, the disk array information acquisition program 801 is capable of generating the volume information 702 and storage medium packaging information 704 on the basis of the disk array device from which the storage medium management information 601, RAID group management information 602, and volume management information 603 was obtained, and storing the generated information in the memory 502. More specifically, for example, the storage medium ID, RAID group ID, type, vendor, model, revision, and serial number in the storage medium packaging information 704 may be set as the storage medium ID, RAID group ID, type, vendor, model, revision, and serial number recorded in the storage medium management information 601, and the disk array ID in the storage medium packaging information 704 may be set as the disk array ID of the disk array device 300 serving as the acquisition source of the storage medium management information 601. Further, for example, the volume ID, RAID group ID, and size in the volume information 702 may be set as the volume ID, RAID group ID, and size recorded in the volume management information 603, and the disk array ID in the volume information 702 may be set as the disk array ID of the disk array device 300 serving as the acquisition source of the volume management information 603.

Figure 12:
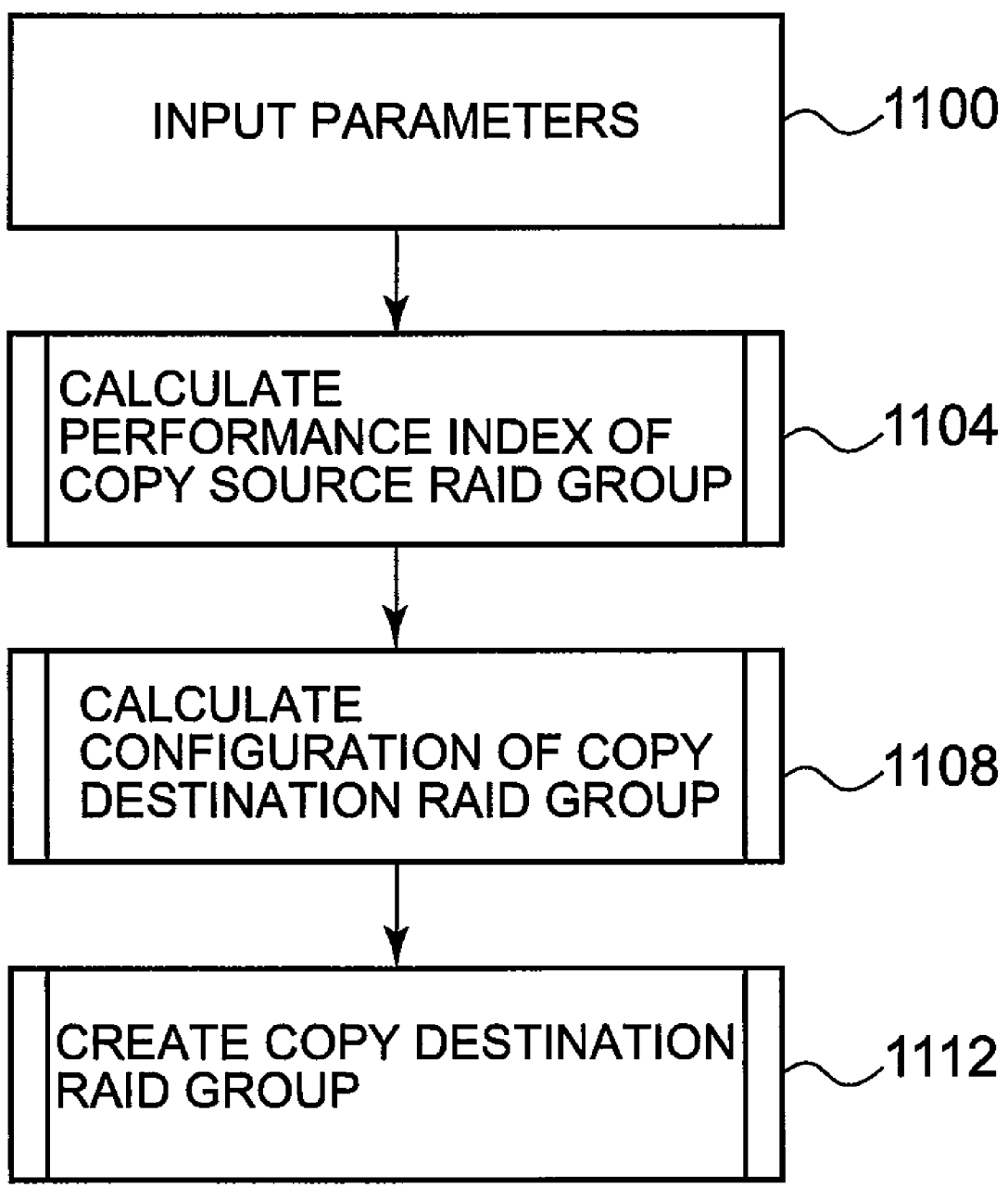
FIG. 12 is a flowchart of processing performed by an appropriate RAID group creation program.

Next, processing is executed by the appropriate RAID group creation program 805 to create a copy destination RAID group. More specifically, the processing shown in FIG. 12 is executed.

In a step 1100, the appropriate RAID group creation program 805 receives the requirements of the RAID group to be created in the form of parameters. The six requirements described below in (1100-1) to (1100-6) serve as examples of the requirements for the RAID group.

(1100-1) The RAID group ID of the copy source RAID group
(1100-2) The disk array ID of the disk array device having the copy source RAID group
(1100-3) The disk array ID of the disk array device to serve as the creation destination of the copy destination RAID group (in other words, the disk array device to comprise the copy destination RAID group)
(1100-4) The RAID level of the copy destination RAID group
(1100-5) The maximum data amount that can be recorded by the copy destination RAID group (the RAID group capacity)
(1100-6) The type of storage media constituting the copy destination RAID group These parameters can be supplied to the optimum RAID group creation program 805 by the user of the management computer 500 or another computer program via a graphical user interface, a command line interface, or the management network 200.

Note that input of the parameter (1100-3) may be omitted, and when omitted, this may be interpreted to mean that the disk array ID of the disk array device comprising the copy source RAID group has been specified.

Similarly, input of the parameter (1100-4) may be omitted, and when omitted, this may be interpreted to mean that an identical RAID level to the RAID level of the copy source RAID group has been specified.

Similarly, input of the parameter (1100-5) may be omitted, and when omitted, this may be interpreted to mean that an identical RAID group capacity to the RAID group capacity of the copy source RAID group has been specified.

In a step 1104, the appropriate RAID group creation program 805 causes the RAID group performance index calculation program 802 to calculate the performance index of the specified copy source RAID group. A method of calculating the performance index will be described in detail later.

In a step 1108, the optimum RAID group creation program 805 causes the RAID group calculation program 803 to calculate a RAID group configuration conforming to the performance index obtained in the step 1104.

In a step 1112, the optimum RAID group creation program 805 causes the RAID group creation program 804 to create a RAID group having the configuration obtained in the step 1108.

When the step 1112 is complete, the processing of the optimum RAID group creation program 805 ends. After the step 1112, the optimum RAID group creation program 805 may provide the volume copying program 806 with the following four parameters (806-1) to (806-4) and cause the volume copying program 806 to execute copy processing.

(806-1) The disk array ID of the disk array device having the copy source volume (806-2) The volume ID of the copy source volume (806-3) The disk array ID of the disk array device having the copy destination volume (806-4) The volume ID of the copy destination volume Upon reception of these parameters (806-1) to (806-4), the volume copying program 806 is capable of instructing the disk array device identified by the parameter (806-1) to copy the copy source volume identified by the parameter (806-2) to the copy destination volume identified by the parameter (806-3) of the disk array device identified by the parameter (806-3).

Note that the volume ID of the parameter (806-2) and/or the parameter (806-3) may be a RAID group ID. Further, the volume copying program 806 may be run on a computer other than the management computer 500. The volume copying program 806 may use either the SAN 100 or the management network 200 to communicate with the disk array device. Upon reception of a volume copying instruction from the volume copying program 806, the disk array device is capable of beginning an operation to copy data in the specified copy source volume to the specified copy destination volume. In the case of remote copying, data may be copied to a copy destination disk array device (a disk array device specified in the instruction from the volume copying program 806). In cases where the disk array device does not possess a function for copying a volume or the like, the volume copying program 806 and another device may read the data from the specified copy source volume and write the data to the specified copy destination volume. In this case, the computer on which the volume copying program 806 runs and the device for copying the data are connected to the SAN 100 or the management network 200, and the volume copying program 806 communicates with the copy destination and copy source disk array devices via these networks.

After receiving an instruction regarding whether or not to copy the data of a RAID group from the user and creating a RAID group, the appropriate RAID group creation program 805 may copy the data in the copy source RAID group to the copy destination RAID group using the volume copying program 806. Further, after creating a RAID group using the appropriate RAID group creation program 805, the user may execute data copying at a desired timing.

(Calculation of Performance Index of Copy Source RAID Group (Detailed Description of Step 1104 in FIG. 12))

In the step 1104 in FIG. 12, for example, the RAID group performance index calculation program 802 is accessed by the appropriate RAID group creation program 805, and receives the following two parameters (1104-1) and (1104-2).

(1104-1) The disk array ID (for example, the aforementioned parameter (1100-2)) of the disk array device having the copy source RAID group (i.e. the disk array device having the calculation subject RAID group)

(1104-2) The RAID group ID (for example, the aforementioned parameter (1100-1)) of the copy source RAID group (i.e. the calculation subject RAID group)

The RAID group performance index is calculation using a calculation method corresponding to the RAID level of the copy source RAID group (a RAID level received from the disk array device specified by the parameter (1104-1) in response to an enquiry placed with the disk array device using the parameter (1104-2) as a key), for example. An example of this calculation method will be cited below. Further, an index of the writing performance (writing performance index hereafter) and an index of the reading performance (reading performance index hereafter) exist as the performance index calculated in the first embodiment, and hence these two performance indices will also be described.

(When RAID Level is RAID 5 or RAID 6)

Writing performance index={(sum total of writing performances of storage media provided in copy source RAID group)/(RAID group width)}× (RAID group width−parity width)

Reading performance index=sum total of reading performances of storage media provided in copy source RAID group Here, the "copy source RAID group width" is the number of storage media constituting a stripe in the copy source RAID group. More specifically, for example, when a copy source RAID group of RAID 5 is constituted by ten storage media and a single I/O is executed by five storage media, the copy source RAID group width is "5". Further, the "parity width" denotes the number of storage media recorded with redundant data per stripe. Further, the "sum total of the writing performances" and the "sum total of the reading performances" are respectively the total data transfer speed during writing and the total data transfer speed during reading, which are specified from the storage medium specification information 703. More specifically, for example, by referring to the storage medium packaging information 704 using the parameters (1104-1) and (1104-2) as a key, the type, vendor, model, and revision of each storage medium belonging to the copy source RAID group can be specified, and the data transfer speed during writing and data transfer speed during reading corresponding to the specified type, vendor, model, and revision can be specified from the storage medium specification information 703. Then, using the data transfer speed during reading and data transfer speed during writing specified in relation to each storage medium belonging to the copy source RAID group, the writing performance index and reading performance index described above can be calculated.

(When the RAID Level is RAID 1+0 (or 0+1))

Writing performance index=(smaller of writing performances of two mirrored stripes)

Reading performance index=(smaller of reading performances of two mirrored stripes)

Here, the "writing performance of a stripe" is the total writing performance (in the method described above, the data transfer speed during writing that can be specified from the storage medium specification information 703) of the storage media constituting a stripe. Similarly, the "reading performance of a stripe" is the total reading performance (in the method described above, the data transfer speed during reading that can be specified from the storage medium specification information 703) of the storage media constituting a stripe. Note that hereafter, the term "RAID 1" is assumed to include both RAID 1+0 and RAID 0+1.

The RAID group performance index calculation program 802 is capable of obtaining information relating to the configuration of the calculation subject RAID group (copy source RAID group) from a disk array device that can be accessed using connection information specified from the disk array information 701 with the parameter (1104-1) as a key, for example. More specifically, for example, a storage medium list corresponding to the copy source RAID group and a RAID level corresponding to the copy source RAID group (both of which are information elements of the RAID group management information 602) can be obtained from the disk array device by issuing the disk array device with an enquiry specifying the parameter (1104-2). Note that these information elements may be obtained at a prior stage to the beginning of the processing in FIG. 12 and stored in the memory 502.

The RAID group performance index calculation program 802 can output the calculated performance index (writing performance index and reading performance index) of the copy source RAID group. Here, output may take the form of display on a display device or result transmission to another program, for example.

Performance index calculation was described above. Note that the performance index of the copy source RAID group may be calculated by actually measuring the reading transfer speed or writing transfer speed of the copy source RAID group.

(Calculation of Copy Destination RAID Group Configuration (Detailed Description of Step 1108 in FIG. 12))

Figure 11:
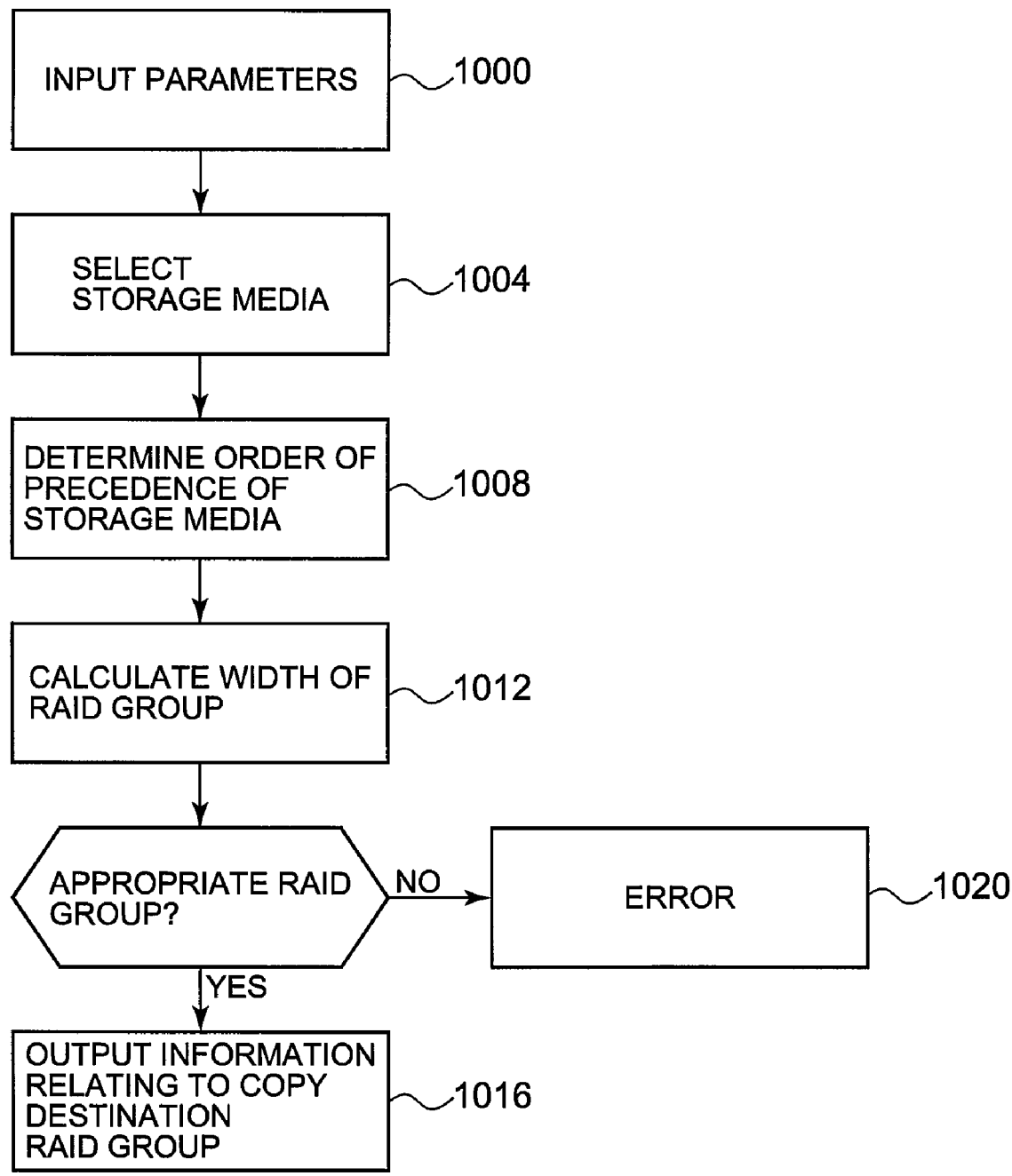
FIG. 11 is a flowchart of processing performed by a RAID group calculation program.

In the step 1108 in FIG. 12, for example, the RAID group calculation program 803 is accessed by the appropriate RAID group creation program 805, and executes the processing of FIG. 11.

FIG. 11 is a flowchart of the processing performed by the RAID group calculation program 803.

In a step 1000, the RAID group calculation program 803 receives the following parameters as the requirements of the copy destination RAID group.

(1000-1) The disk array ID of the disk array device serving as the creation destination of the copy destination RAID group (for example, the aforementioned parameter (1100-3))

(1000-2) The RAID level of the copy destination RAID group (for example, the aforementioned parameter (1100-4))

(1000-3) The performance index required by the copy destination RAID group (the required performance index hereafter)

(1000-4) The maximum data amount that can be recorded in the copy destination RAID group (the copy destination RAID group capacity) (for example, the aforementioned parameter (1100-5))

(1000-5) The types of storage media constituting the copy destination RAID group (for example, the aforementioned parameter (1100-6))

The RAID group calculation program 803 is provided with these parameters by the user of the management computer 500 or another program (for example, the appropriate RAID group creation program 805) via a graphical user interface, a command line interface, or the management network 200. Note that the "required performance index" of the parameter (1000-3) is the maximum performance during sequential writing to the copy destination RAID group or the maximum performance thereof during sequential reading, for example, as a value of the data transfer amount per unit time (bytes/sec). Hereafter, the maximum performance during sequential writing as a value of the data transfer amount per unit time (bytes/sec) will be referred to as the "required writing performance index", while the maximum performance during sequential reading as a value of the data transfer amount per unit time (bytes/sec) will be referred to as the "required reading performance index". The term "sequential" typically means that during copying, reading and writing are performed sequentially. The required writing performance index is set at N times the reading performance index of the copy source RAID group (where N>1 (for example, N=1.1)), and is calculated by the user of the management computer 500 or the RAID group calculation program 803 in the step 1104 of FIG. 12. This is to prevent a situation in which, during copying, the writing speed to the copy destination RAID group becomes slower than the reading speed from the copy source RAID group, leading to a decrease in the copy speed. Accordingly, the RAID group calculation program 803 may be configured to be incapable of accepting a required writing performance index that does not exceed the reading performance index of the copy source RAID group, for example. Alternatively, the RAID group calculation program 803 may be configured to calculate a required writing performance index that exceeds the reading performance index of the copy source RAID group automatically, for example.

In the step 1004, the RAID group calculation program 803 selects storage medium candidates for the RAID group from among the storage media (the storage media specified from the storage medium packaging information 704 using the parameter (1000-1) as a key) packaged in the specified disk array device (the disk array device specified from the parameter (1000-1)). This selection is performed using the following algorithm, for example.

Storage media already used in a RAID group (i.e. storage media associated with a RAID group ID) are not selected as candidates Storage media of a type other than the specified type are not selected as candidates Storage media other than those described above are selected as candidates In a step 1008, the RAID group calculation program 803 determines a selection order of precedence in relation to the storage media selected in the step 104. This order of precedence is determined by evaluating the individual information elements of the storage media in the following order.

When the required writing performance index is specified as the parameter (1000-3), storage media having a high writing data transfer speed are given a high order of precedence, and when the required reading performance index is specified as the parameter (1000-3), storage media having a high reading data transfer speed are given a high order of precedence. In each of these cases, when the writing data transfer speed or the reading data transfer speed is equal, the storage medium having the larger storage capacity is given a higher order of precedence. The storage capacity of the storage medium can be specified from a combination of the type, vendor, model, and revision of the storage medium. Alternatively, the storage capacity may be recorded in the storage medium management information 601, the storage medium specification information 703, or the like and specified from this information 601, 703, or the like.

In a step 1012, the RAID group calculation program 803 calculates the width of the copy destination RAID group. This calculation is performed using the following procedure, for example.

(1012-1)

The RAID group calculation program 803 determines an initial value of the copy destination RAID group width (occasionally denoted by "LEN" hereafter) in accordance with the RAID level in the parameter (1000-2). More specifically, for example, when RAID 6 is specified as the RAID level, the initial value is set at "4", when RAID 5 is specified, the initial value is set at "3", and when RAID 1 is specified, the initial value is set at "1".

(1012-2)

The RAID group calculation program 803 selects storage media from the plurality of storage media selected in the step 1004 in order from the storage medium having the highest order of precedence determined in the step 1008. The number of selected storage media is also determined in accordance with the RAID level in the parameter (1000-2). More specifically, for example, when the RAID level is RAID 5, LEN storage media (i.e. the same number as the width of the copy destination RAID group) are selected, and when the RAID level is RAID 1, (LEN×2) storage media are selected. If the total storage capacity of the selected storage media is smaller than the copy destination RAID group capacity specified in the parameter (1000-4), program execution is assumed to have failed (step 1020). Further, when storage media cannot be determined due to a lack of packaged storage media or the like, program execution is likewise assumed to have failed (step 1020).

(1012-3)

The RAID group calculation program 803 determines the performance index (U) of the RAID group (to be referred to hereafter in this paragraph as the "subject RAID group") to be configured using the storage media selected in (1012-2). This value U varies depending on whether the required writing performance index or the required reading performance index has been specified as the parameter (1000-3). More specifically, when the required writing performance index is specified, the value U is the writing performance index of the subject RAID group, and when the required reading performance index is specified, the value U is the reading performance index of the subject RAID group. The calculation method used by the RAID group performance index calculation program 802 may be employed to calculate the respective performance indices.

(1012-4)

The RAID group calculation program 803 determines whether or not the calculated value U is smaller than the required performance index. When the calculated value U is smaller than the required performance index, the calculation processing is re-executed from (1012-2) with LEN=LEN+1, and when the calculated value U is equal to or larger than the required performance index, the routine advances to a step 1016.

In the step 1016, the RAID group calculation program 803 outputs a list of the storage medium IDs of the storage media constituting the copy destination RAID group width calculated in the step 1012. Here, output may take the form of display on a display device or data transmission in a format that can be interpreted by another program, for example.

Using the processing flow described above, the configuration of a copy destination RAID group that conforms to the requested requirements (parameters) is calculated.

(Creation of Copy Destination RAID Group (Detailed Description of Step 1112 in FIG. 12))

The RAID group creation program 804 transmits a RAID group creation instruction specifying the following three parameters (1112-1) to (1112-3) to the disk array device specified from a parameter (1112-1) to be described below.

(1112-1) The disk array ID of the disk array device serving as the creation destination of the copy destination RAID group (for example, the aforementioned parameter (1100-3))

(1112-2) The storage medium IDs of the storage media serving as configuration elements of the copy destination RAID group (a list of storage medium IDs of the storage media ultimately selected in the processing of FIG. 11)

(1112-3) The RAID level of the copy destination RAID group (for example, the aforementioned parameter (1100-4))

In the disk array device, a computer program executed by the processor 316 of the management controller 307, for example, creates a RAID group corresponding to the parameters specified in the RAID group creation instruction in response to the RAID group creation instruction, and at the same time updates the storage medium management information 601 and RAID group management information 602.

Thereafter, when the processing of FIG. 12 is executed again, the processing is executed on the basis of the storage medium packaging information 702, which is updated on the basis of the updated storage medium management information 601 and RAID group management information 602.

According to the first embodiment described above, a higher value than the reading performance index of the copy source RAID group is specified as the required writing performance index of the copy destination RAID group, and a copy destination RAID group that satisfies the required writing performance index is created. In so doing, the amount of data written to the copy destination RAID group per unit time can be made larger than the amount of data read from the copy source RAID group per unit time, and as a result, the reading performance of the copy source RAID group can be exhibited sufficiently.

Also according to the first embodiment, a storage medium product is determined according to a plurality of storage medium attributes, for example the type, vendor, model, and revision, and the RAID group performance index is calculated on the basis of a reading data transfer speed and a writing data transfer speed that are unique to the storage medium product using a calculation method corresponding to the RAID level of the RAID group. Thus, an accurate index can be expected as the performance of the RAID group.

The first embodiment was described above.

Note that the disk array ID may be an IP address set in the disk array device. Further, the volume ID may be a set comprising port identification information and a LUN, or information defined internally by the disk array device.

Further, storage medium rating information may be set in each storage medium or each storage medium type. The aim of this rating information is to determine an order of precedence for the used storage media when creating a RAID group. Storage medium rating may be performed by setting arbitrary numerical values or through a user operation of the management computer 500. Alternatively, the management computer 500 may set the rating information automatically on the basis of information such as the type, vendor, model, revision, and serial number of the storage media. The RAID group calculation program 803 may then select the storage media constituting the RAID group on the basis of the storage medium rating information (in descending order of rating, for example).

Also, a further parameter (to be referred to hereafter as an access classification parameter) specifying a random access required performance index or a sequential access required performance index may be input into the RAID group calculation program 803. At this time, when an access classification parameter specifying random access is input, the RAID group calculation program 803 may give storage media having a small average access time a higher order of precedence during the storage medium ordering processing of the step 1008.

Further, a parameter (to be referred to hereafter as an average I/O size parameter) indicating the average I/O size may be input into the RAID group calculation program 803. When random access is specified in the access classification parameter and a sufficiently large average I/O size (for example, a size exceeding a predetermined threshold) is specified in the average I/O size parameter, the RAID group calculation program 803 either performs no evaluation based on the aforementioned average access time or attributes less importance to this evaluation criterion than other evaluation criteria during storage medium ordering.

Further, the copying described above may be performed to obtain data backup or to restore backed-up data. More specifically, for example, when a copy destination RAID group is created in the appropriate RAID group creation program 805, the writing performance index of the copy destination RAID group may be set to exceed the reading performance index of the copy source RAID group, as described above, and in addition, the writing performance index of the copy source RAID group may be set to exceed the reading performance index of the copy destination RAID group. In so doing, the writing performance of the copy source RAID group can be used efficiently not only during backup copying, but also when copying is performed to restore data to the copy source RAID group from the copy destination RAID group. Alternatively, the copy destination RAID group may be configured taking only the copy speed during restoration into consideration and ignoring the reading performance index of the copy source RAID group. By creating a RAID group giving priority to restoration in this manner, a system configuration in which fault restoration is performed quickly can be achieved. Note that in this modified example, a parameter denoting the restoration precedence may be input into the RAID group calculation program 803, and the RAID group calculation program 803 may control the performance index of the copy destination RAID group on the basis of the restoration precedence indicated by the parameter, for example. Three degrees of precedence, namely "highest priority", "same level", and "no priority", for example, may be set. When the precedence is "highest priority", the RAID group calculation program 803 may ensure that the writing performance index of the copy source RAID group exceeds the reading performance index of the copy destination RAID group, taking only the copy speed during restoration into consideration (in other words, ensuring only that the reading performance of the copy destination RAID group that serves as the copy source during restoration is sufficiently exhibited), and ignoring the reading performance index of the copy source RAID group. When the precedence is "same level", the RAID group calculation program 803 may ensure that the writing performance index of the copy destination RAID group exceeds the reading performance index of the copy source RAID group (for example, setting the writing performance index (required writing performance index) of the copy destination RAID group at N times (N>1) the reading performance index of the copy source RAID group, as described above), and ensuring that the writing performance index of the copy source RAID group exceeds the reading performance index of the copy destination RAID group (such that the reading performance index (required reading performance index) of the copy destination RAID group is 1/N times the writing performance index of the copy source RAID group, for example). When the precedence is "no priority", the RAID group calculation program 803 need only ensure that the writing performance index of the copy destination RAID group exceeds the reading performance index of the copy source RAID group, and the writing performance index of the copy source RAID group may be ignored.

Second Embodiment

A second embodiment of the present invention will be described below. The following description will focus on differences with the first embodiment, and the description of commonalties with the first embodiment will be omitted or simplified.

In the second embodiment, a single logical volume is created by coupling together a plurality of logical volumes such that when data are copied, the copying performance is enhanced by accessing the respective coupled volumes concurrently. Hereafter, a single logical volume created by coupling a plurality of logical volumes together will be referred to as a "coupled volume", and the plurality of logical volumes serving as configuration elements of the coupled volume will each be referred to as a "fragment volume".

Figure 14A:
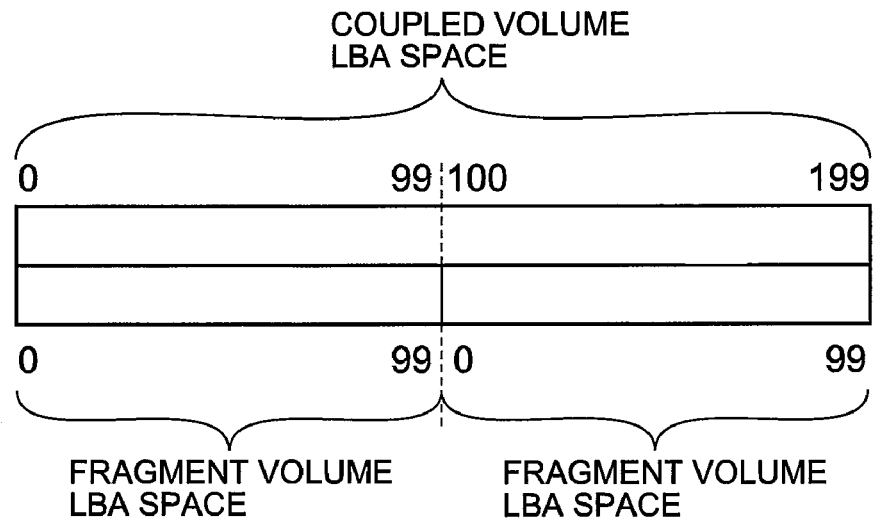
FIG. 14A is a view showing an association between an LBA of a coupled volume and an LBA of a fragment volume.
Figure 14B:
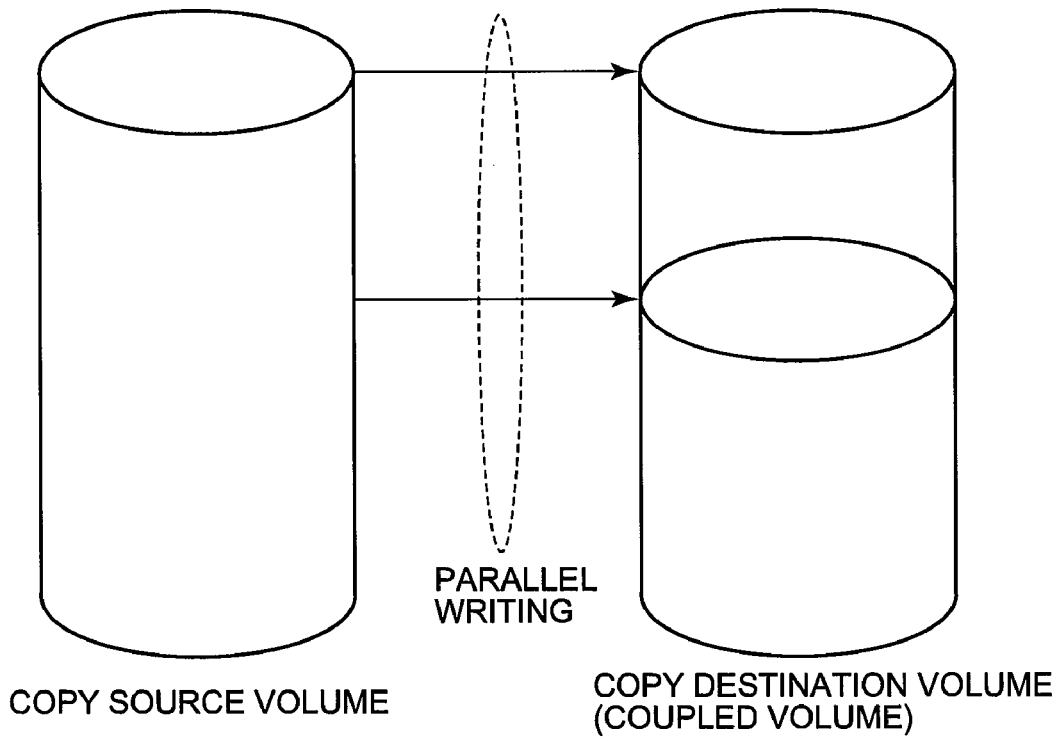
FIG. 14B is a view illustrating copying when one logical volume is set as a copy source and a coupled volume is set as a copy destination.

As shown in FIG. 14A, the LBA of a coupled volume corresponds to the LBA of a fragment volume, and an I/O request to an LBA of a coupled volume is processed after being converted into the LBA of a fragment volume. Thus, as shown in FIG. 14B, when the copy destination volume is a coupled volume and the copy source volume is a single logical volume having a size that is equal to or smaller than (for example, the same size as) the coupled volume, for example, data are read concurrently from the plurality of LBAs (a plurality of LBAs corresponding respectively to the starting LBAs of the plurality of fragment volumes constituting the coupled volume) of the copy source volume during copying, and the read data are written concurrently to the plurality of fragment volumes.

Figure 17:
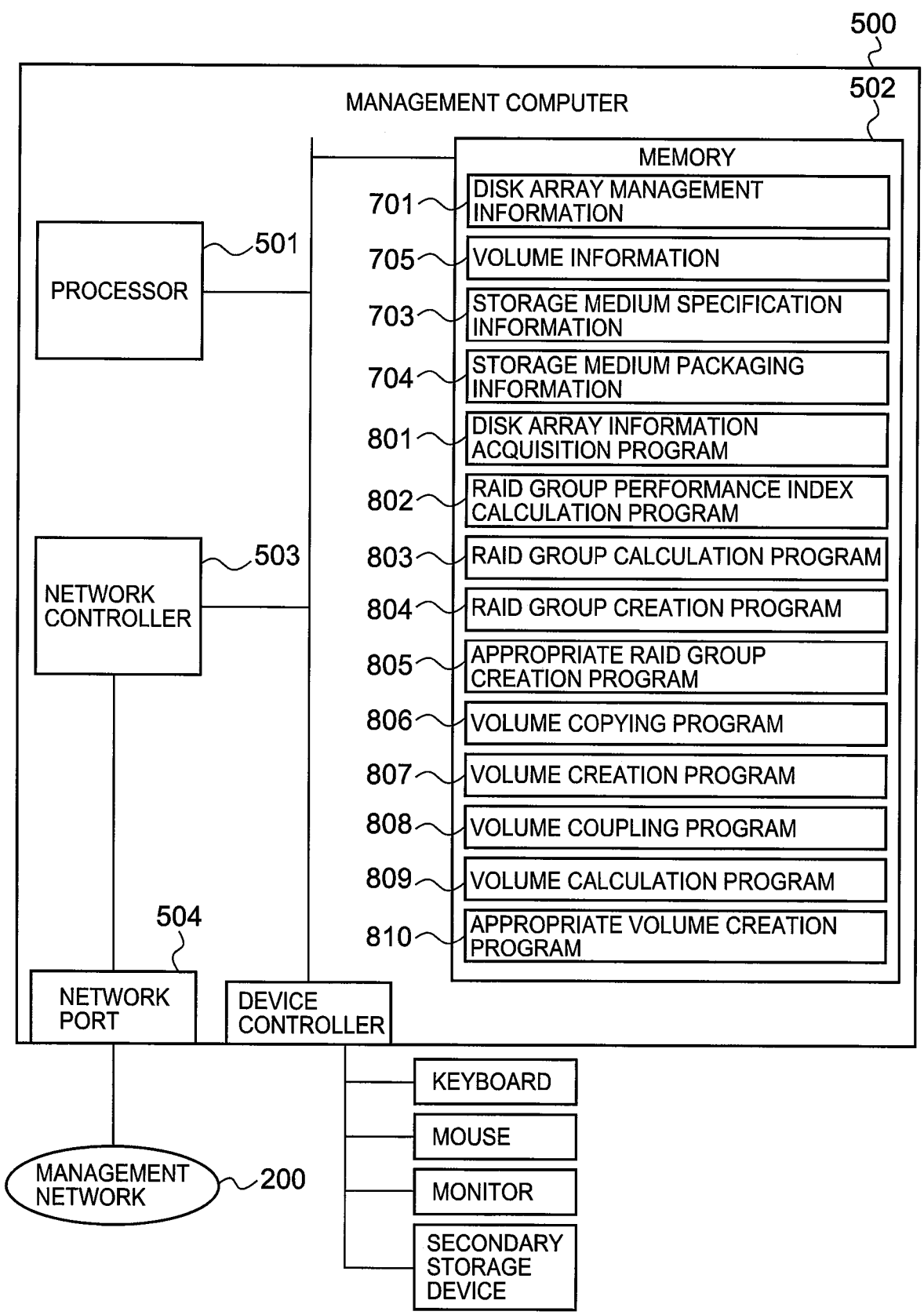
FIG. 17 shows an example of the configuration of a management computer according to the second embodiment of the present invention.

FIG. 17 shows an example of the configuration of the management computer 500 in the second embodiment of the present invention. FIG. 17 differs from FIG. 6 of the first embodiment in that the volume information is denoted by the reference numeral 705, and a volume creation program 807, a volume coupling program 808, a volume calculation program 809, and an appropriate volume creation program 810 are also stored in the memory 502. These differences will be described below in detail.

Volume Information of Second Embodiment

FIG. 13 shows an example of the configuration of the volume information 705 in the second embodiment of the present invention.

A used/unused flag is recorded on each row of the volume information 705 as a further information element. The used/unused flag is information indicating whether or not a subject logical volume is in use. When a logical volume is in use, a value of "1" is set in the corresponding used/unused flag, and when a logical volume is not in use, a value of "0" is set in the corresponding used/unused flag. Note that in the second embodiment, the term "the volume is in use" indicates either the following state A or the following state B, for example.

(State A)

In this state, a logical unit number (LUN) is set in the logical volume such that the host computer 400 can perform data reading/writing from and to the logical volume via the I/O port 310 of any of the disk array devices.

(State B)

In this state, the logical volume is a fragment volume (in other words, a configuration element of a coupled volume)

(Programs Executed by Management Computer)

As described above, the volume creation program 807, volume coupling program 808, volume calculation program 809, and appropriate volume creation program 810 are also stored in the memory 502 of the management computer 500.

The volume creation program 807 is a program for creating a volume in a specified RAID group. The volume coupling program is a program for coupling specified volumes into a single volume. The volume calculation program 809 is a program for calculating a volume configuration satisfying specified performance requirements. The appropriate volume creation program 810 is a program for creating a volume having a suitable performance as a copy destination of the specified volume.

Processing Performed in Second Embodiment

Processing performed in the second embodiment will now be described.

(Logical Volume Creation)

The volume creation program 807 receives a disk array ID, a RAID group ID, and a size (the size of the logical volume to be created) as parameters, for example. The volume creation program 807 transmits a volume creation instruction specifying the RAID group ID and size to the disk array device specified from the received disk array ID. In the disk array device, a computer program executed by the processor 316 of the management controller 307, for example, creates a logical volume corresponding to the parameters specified in the volume creation instruction in response to the volume creation instruction (specifically, a logical volume having the specified size is created on the specified RAID group), and at the same time updates the volume management information 603. Further, a logical volume creation success notification may be transmitted back to the management computer 500 from the disk array device. In this case, the volume creation program 807 may update the volume information 705.

(Volume Coupling)

The volume coupling program 808 receives a disk array ID and a volume ID list as parameters, for example. The volume ID list is a list of volume IDs of the logical volumes serving as fragment volumes. The volume coupling program 808 transmits a volume coupling instruction specifying the specified volume ID list to the disk array device specified from the received disk array ID. In the disk array device, a computer program that is executed by the processor 316 of the management controller 307, for example, specifies a plurality of logical volumes from the volume ID list specified in the volume coupling instruction in response to the volume coupling instruction, creates a coupled volume using the specified plurality of logical volumes, and at the same time updates the volume management information 603. Further, a coupled volume creation success notification may be transmitted back to the management computer 500 from the disk array device, and in this case, the volume coupling program 808 may update the volume information 705 (by altering the value of the used/unused flag corresponding to the fragment volumes from "0" to "1", for example).

(Specification of Whether Copy Destination Storage Device is RAID Group or Logical Volume)

In the management computer 500, the user, another computer program, or the like specifies whether the copy destination storage device to be created is a RAID group or a logical volume. When the copy destination storage device is specified as a RAID group, the processing described with reference to FIG. 12 is executed, and when the copy destination storage device is specified as a logical volume, the processing shown in FIG. 16 is executed.

(Outline of Appropriate Volume Creation Processing)

Figure 16:
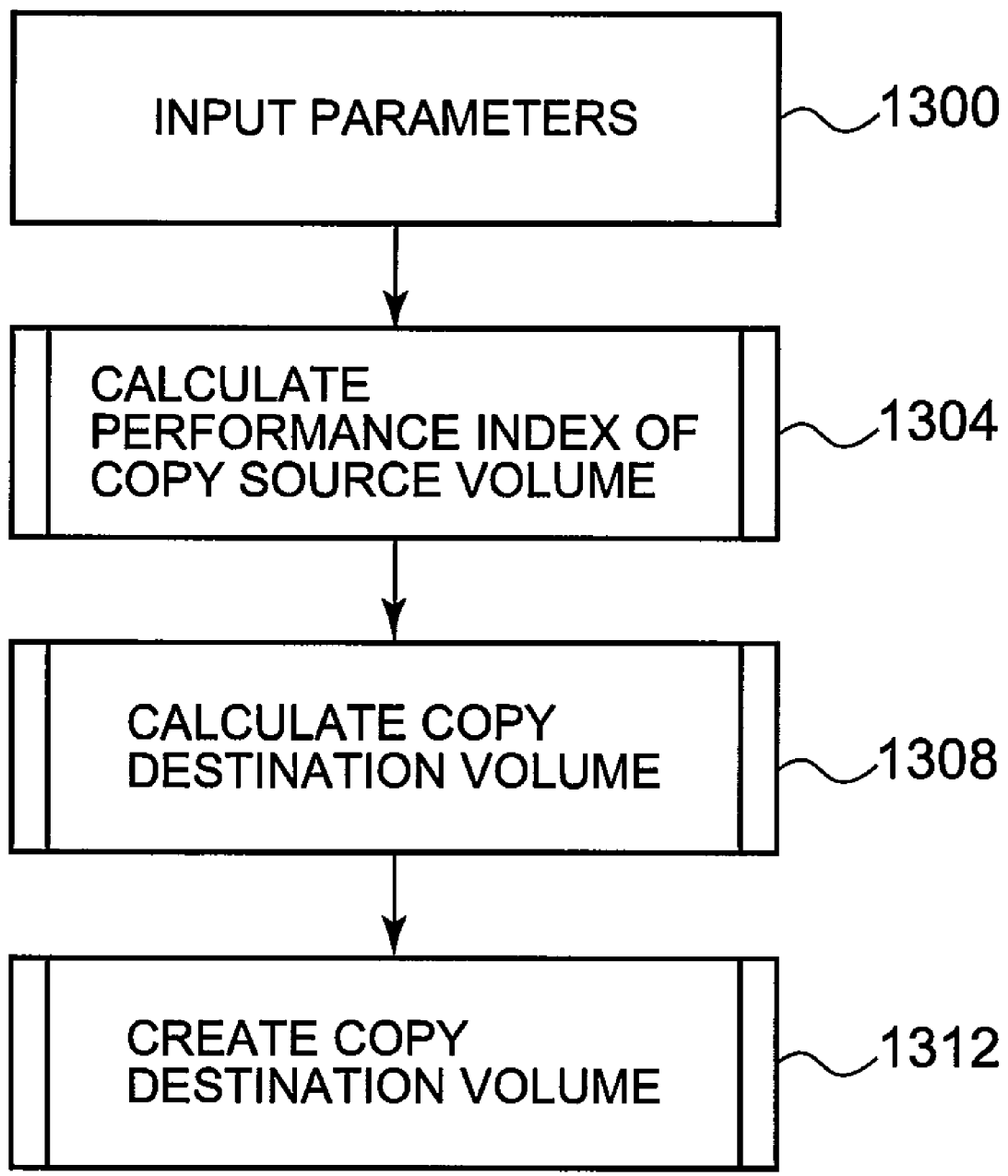
FIG. 16 is a flowchart of processing performed by an appropriate volume creation program.

FIG. 16 is a flowchart of processing performed by the appropriate volume creation program 810.

In a step 1300, the appropriate volume creation program 810 receives the requirements of the RAID group to be created as parameters. The following five parameters (1300-1) through (1300-5) serve as examples of the RAID group requirements.

(1300-1) The volume ID of the copy source volume (1300-2) The disk array ID of the disk array device having the copy source volume (1300-3) The disk array ID of the disk array device serving as the creation destination of the copy destination volume (in other words, the disk array device to be provided with the copy destination volume)

(1300-4) The size of the copy destination volume (1300-5) The type of storage media constituting the copy destination volume The appropriate volume creation program 810 may be provided with these parameters by the user of the management computer 500 or another program via a graphical user interface, a command line interface, and the management network 200.

Note that input of the parameter (1300-3) may be omitted. When the parameter (1300-3) is omitted, this may be interpreted to mean that the disk array ID of the disk array device having the copy source volume has been specified.

Similarly, input of the parameter (1300-4) may be omitted. When the parameter (1300-4) is omitted, this may be interpreted to mean that an identical size to the size of the copy source volume has been specified.

Similarly, input of the parameter (1300-5) may be omitted. When the parameter (1300-5) is omitted, this may be interpreted to mean that identical types to the types of the storage media constituting the copy source volume have been specified.

In a step 1304, the appropriate volume creation program 810 causes the RAID group performance index calculation program 802 to calculate the performance index of the specified copy source volume. The performance index of the RAID group having the copy source volume is used as the performance index.

In a step 1308, the appropriate volume creation program 810 causes the volume calculation program 809 to calculate a copy destination volume configuration conforming to the performance index obtained in the step 1304.

In a step 1312, the appropriate volume creation program 810 causes the volume creation program 807 or volume coupling program 808 to create the copy destination volume obtained in the step 1308.

The processing of the appropriate volume creation program 810 is the terminated. Thereafter, the appropriate volume creation program 810 may copy data from the specified copy source volume to the copy destination volume using the volume copying program 806 either in response to an instruction from the user or without receiving an instruction from the user.

(Calculation of Copy Destination Volume Configuration (Detailed Description of step 1308 in FIG. 16)

Figure 15:
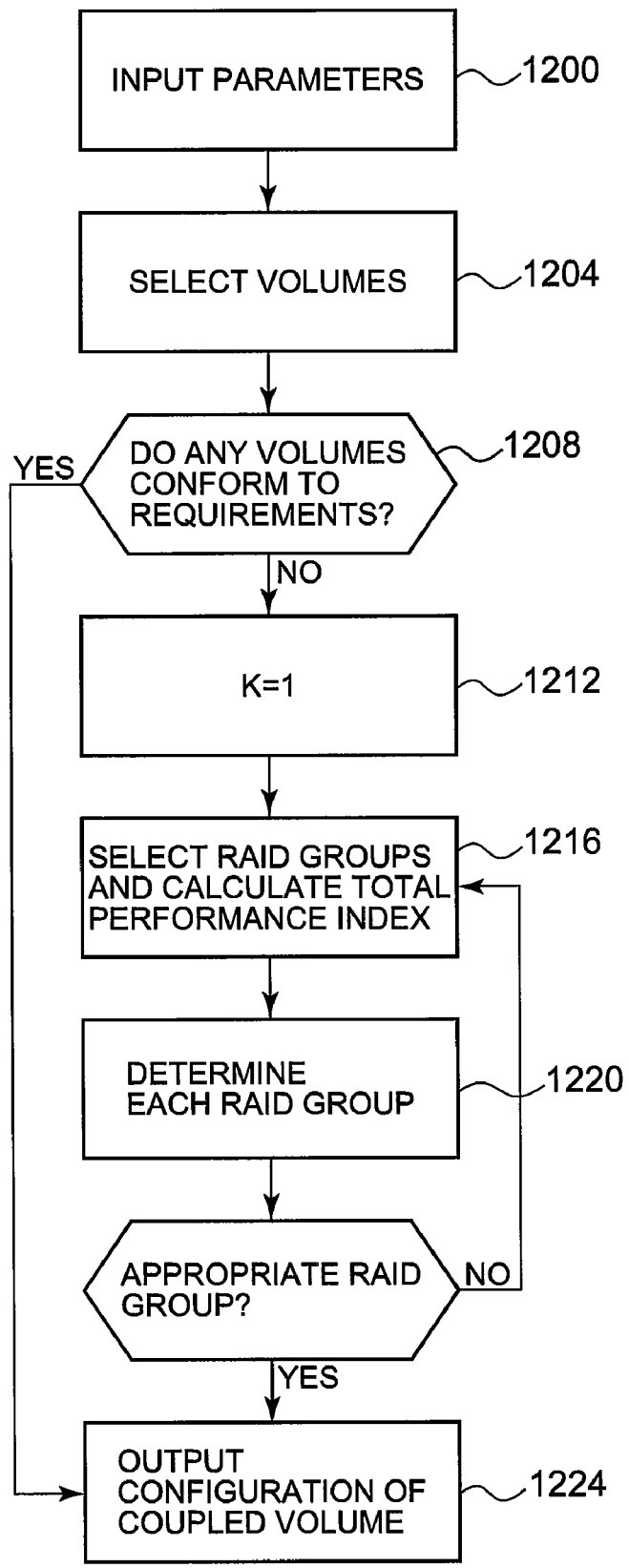
FIG. 15 is a flowchart of processing performed by a volume calculation program.

In the step 1308 of FIG. 16, for example, the volume calculation program 809 is accessed by the appropriate volume creation program 810, and executes the processing of FIG. 15.

FIG. 15 is a flowchart of the processing performed by the volume calculation program 809.

In a step 1200, the volume calculation program 809 receives the following parameters as the requirements of the logical volume.

(1200-1) The disk array ID of the disk array device serving as the creation destination of the copy destination volume (for example, the aforementioned parameter (1300-3))

(1200-2) The required performance index of the copy destination volume (1200-3) The size of the copy destination volume (for example, the aforementioned parameter (1300-4))

(1200-4) The type of storage media constituting the copy destination volume (for example, the aforementioned parameter 1300-5))

(1200-6) The presence of a coupling plan (a parameter indicating whether or not a coupled volume configuration is to be calculated when a logical volume conforming to requirements cannot be configured)

The volume calculation program 809 is provided with these parameters by the user of the management computer 500 or another program (the appropriate volume creation program 810, for example) via a graphical user interface, a command line interface, or the management network 200. Note that the "required performance index" of the parameter (1300-3) is the maximum performance of the copy destination volume during sequential writing or the maximum performance thereof during sequential reading, for example, as a value of the data transfer amount per unit time (bytes/sec). Hereafter, the maximum performance during sequential writing as a value of the data transfer amount per unit time (bytes/sec) will be referred to as the "required writing performance index", while the maximum performance during sequential reading as a value of the data transfer amount per unit time (bytes/sec) will be referred to as the "required reading performance index". The required writing performance index is set at N times (where N>1 (for example, N=1.1)) the reading performance index of the copy source volume (copy source RAID group), and is calculated by the user of the management computer 500 or the RAID group calculation program 803 in the step 1304 of FIG. 16.

In a step 1204, the volume calculation program 809 selects usable volumes from among the logical volumes (logical volumes specified from the volume information 705 using the parameter (1200-1) as a key) existing in the specified disk array device (the disk array device specified from the parameter (1200-1)). This selection is performed using the following algorithm, for example.

Volumes in use are not selected as candidates.

When the storage media of the RAID group having a volume are not of the specified type, the volume is not selected as a candidate.

Volumes other than those described above are selected as candidates.

In a step 1208, when a volume conforming to requirements exists within the candidate volumes selected in the step 1204, the volume calculation program 809 outputs the volume as the result of the volume calculation program. The determination as to whether or not the volume requirements have been satisfied is made in accordance with the following (sub-determination 1) and (sub-determination 2), for example.

(Sub-Determination 1)

When the required writing performance index is specified as the required performance index and the writing performance index of the RAID group having the determination subject candidate volume exceeds the required writing performance index, the volume calculation program 809 determines that the candidate volume conforms to requirements. Further, when the required reading performance index is specified as the required performance index and the reading performance index of the RAID group having the determination subject candidate volume exceeds the required reading performance index, the volume calculation program 809 determines that the candidate volume conforms to requirements. When both the required writing performance index and the required reading performance index are specified as required performance indices and both the writing performance index and reading performance index of the RAID group having the determination subject candidate volume exceed the respective required performance indices, the volume calculation program 809 determines that the candidate volume conforms to requirements. The RAID group having the determination subject candidate volume can be identified from the volume information 705. The information elements (the RAID level, for example) relating to the RAID group can be obtained from the disk array device having the RAID group. The RAID group performance index calculation program 802 is used to calculate the writing performance index and reading performance index of the RAID group.

(Sub-Determination 2)

The volume calculation program 809 determines whether or not the size of the determination subject candidate volume is greater than the specified size (the size indicated by the parameter (1200-3)). When the size of the determination subject candidate volume is greater than the specified size, the candidate volume is determined to conform to requirements.

When a candidate volume determined to conform in both the sub-determination 1 and the sub-determination 2 is found, the information elements (for example, the volume ID) relating to the candidate volume are output by the volume calculation program 809 in a step 1224, for example. If a plurality of candidate volumes are determined to conform in both the sub-determination 1 and the sub-determination 2, the volume calculation program 809 may output the information elements relating to all of the plurality of candidate volumes or one arbitrary candidate volume thereof in the step 1224.

When no volume conforms to the sub-determination 1 and the sub-determination 2 and the parameter (1200-6) indicates that the configuration of a coupled volume is not to be calculated, the volume calculation program 809 transmits information indicating the absence of suitable candidate volumes to the appropriate volume creation program 810. On the other hand, when no volumes conforming to the sub-determination 1 and the sub-determination 2 exist but the parameter (1200-6) indicates that the configuration of a coupled volume is to be calculated, the routine advances to a step 1212.

From the step 1212 onward, the volume calculation program 809 performs processing to calculate the configuration of a coupled volume that conforms to requirements. Hereafter, the number of fragment volumes to be coupled is assumed to be K. In the step 1212, K=1 is set as an initial state.

In a step 1216, the volume calculation program 809 selects K RAID groups in descending order of performance index from among the pre-existing RAID groups provided in the subject disk array device (the disk array device specified in the parameter (1200-1)), and calculates the sum total of the performance indices thereof. The performance index is determined to be the writing performance index, the reading performance index, or both according to whether the required writing performance index, the required reading performance index, or both is specified as the required performance index. If the total performance index is higher than the required performance index, the RAID groups are set as candidate RAID groups having volumes from which a coupled volume may be created. If not, the determination is re-executed with K=K+1. If, as a result, the total performance index is not higher than the required performance index, the volume calculation program 809 outputs information indicating an error, for example, and terminates the processing.

In a step 1220, the volume calculation program 809 determines whether or not each of the RAID groups selected as candidates is appropriate. In this determination, an appropriate RAID group is a RAID group satisfying both of the following (condition 1) and the following (condition 2).

(Condition 1)

A fragment volume having a size (required size hereafter) that is equal to or greater than {(the size specified in the parameter (1200-3))/K} may be newly created, or an unused volume having this size exists.

(Condition 2)

The RAID group has a storage medium of the type indicated in the parameter (1200-4).

The determination as to whether or not a fragment volume having the required size can be newly created may be made according to whether or not the available size of the determination subject RAID group is equal to or greater than the required size, for example. The available size of the determination subject RAID group may be calculated by obtaining the capacity (the capacity stored in the RAID group management information 602) of the determination subject RAID group from the disk array device, calculating the total size (the size specified from the volume information 705) of all of the volumes existing in the RAID group, and subtracting the total size from the RAID group capacity, for example. When it is determined that the available size is not equal to or greater than the required size, a determination is made as to whether or not an unused volume having the required size exists. The determination as to whether or not an unused volume having the required size exists in the determination subject RAID group may be made by referring to the volume information 705.

When it is learned from the determination of the step 1220 that unsuitable RAID groups are included in the plurality of RAID groups selected in the step 1216, the volume calculation program 809 selects RAID groups to serve as replacements for the unsuitable RAID groups from the pre-existing and unselected RAID groups in the subject disk array device in descending order of performance index (when only one unsuitable RAID group exists, the RAID group having the highest performance index is selected). The total performance index of the K RAID groups, including the RAID groups selected here, is then calculated, and when the total is lower than the required performance index, processing is re-executed from the step 1216 onward with K=K+1.

As a result of the processing described above, a plurality of RAID groups respectively having the plurality of fragment volumes constituting the coupled volume are determined. According to the flow described above, a single fragment volume is selected from a single RAID group, but two or more fragment volumes may be selected from a single RAID group.

In a step 1224, information relating to the volume conforming to requirements is output. When a volume is confirmed in the step 1208, the information elements relating to this volume (for example, the disk array ID of the disk array device having the volume and the volume ID of the volume) are output, for example. Further, when RAID groups comprising fragment volumes are confirmed in the step 1220, the information elements relating to each fragment volume and the information elements relating to the coupled volume are output. Examples of the information elements of the fragment volumes and coupled volumes include the RAID group ID of the determined RAID groups, the capacity of the RAID groups, and the volume ID of the fragment volumes (assuming that the pre-existing unused volume is a fragment volume, for example). When a plurality of suitable volumes are coupled volumes exist, all or a part thereof may be output. Further, when the maximum number of fragment volumes is determined in advance and a coupled volume configuration in which the number of fragment volumes remains within the maximum number cannot be calculated, an error may be returned.

According to the second embodiment described above, a copy destination volume suited to the performance index of the copy source volume can be created. More specifically, for example, a copy destination volume having a writing performance that is better than the reading performance of the copy source volume can be created. Further, a coupled volume can be created from a plurality of fragment volumes having a writing performance that is poorer than the reading performance of the copy source volume, and data can be written to the coupled volume concurrently from a plurality of positions in the copy source volume. In either case, the reading performance of the copy source volume can be exhibited sufficiently.

Note that the modified example of the first embodiment may be employed appropriately in the second embodiment. For example, by setting the required reading performance index of the copy destination volume at a lower value than the writing performance index of the copy source volume, high-speed restoration from the copy destination volume to the copy source volume can be expected.

Several embodiments of the present invention were described above, but these embodiments are merely examples for illustrating the present invention, and the scope of the present invention is not limited to these embodiments alone. The present invention may be implemented in various other aspects without departing from the spirit thereof. For example, the computer programs and various types of information described above may be stored in a secondary storage device connected to the management computer 500 or a disk array device connected to the SAN 100, and read to a primary storage area of the memory or the like appropriately as needed. Further, the various programs and information in the management computer 500 may be packaged in a device (a disk array device, for example) other than the management computer 500, and the programs may be executed by this other device, for example. Further, the storage medium specification information may be packaged in the disk array device, for example. Further, the disk array device may read information relating to the storage medium from the storage medium itself, and record the read information in the storage medium specification information. Further, information input by the user may be recorded in the storage medium specification information. Furthermore, one RAID group and at least one logical volume may be constituted by a storage medium in which at least the type, from among the plurality of storage medium attributes, is identical.

What is claimed is:

1. A computer comprising:
   a processor;
   a performance calculation unit; and
   a second storage device determination unit,
   wherein the performance calculation unit causes the processor to execute steps of:
   specifying a configuration of a first storage device by referencing first configuration information relating to a configuration of a first storage system having the first storage device;

specifying one or more storage medium access performances corresponding respectively to one or more storage media constituting the first storage device by referencing storage medium performance information indicating the storage medium access performance of each of the storage media; and calculating a first storage device access performance index of the first storage device based on the specified one or more storage medium access performances, wherein the second storage device determination unit causes the processor to execute a step of identifying a second storage device having a storage device access performance index that is equal to or greater than a second storage device access performance index, wherein the second storage device access performance index is determined based on the calculated first storage device access performance index, wherein the second storage device is identified by referencing the storage medium performance information and second configuration information relating to a configuration of a second storage system having the second storage device related to the first storage device, wherein the first storage device is a copy source storage device, wherein the second storage device is a copy destination storage device, wherein the first storage device access performance index is a copy source reading performance index, which is an index of a reading performance of the copy source storage device, wherein the second storage device access performance index is a copy destination writing performance index, which is an index of a writing performance of the copy destination storage device, and wherein the copy destination writing performance index determined on the basis of the calculated copy source reading performance index exceeds the copy source reading performance index.

2. The computer according to claim 1, wherein the copy source storage device is a backup source storage device when backup is performed, and a restoration destination storage device when restoration is performed, wherein the copy destination storage device is a backup destination storage device when backup is performed, and a restoration source storage device when restoration is performed, wherein the first storage device access performance index is a copy source reading performance index, which is an index of the reading performance of the copy source storage device, and a copy source writing performance index, which is an index of the writing performance of the copy source storage device, wherein the second storage device access performance index is a copy destination writing performance index, which is an index of the writing performance of the copy destination storage device, and a copy destination reading performance index, which is an index of the reading performance of the copy destination storage device, and wherein the copy destination writing performance index determined on the basis of the calculated copy source reading performance index exceeds the copy source reading performance index, and the copy destination reading performance index determined on the basis of the calculated copy source writing performance index is smaller than the copy source writing performance index.

3. The computer according to claim 1, wherein the storage medium access performance is a data transfer speed during sequential writing and a data transfer speed during sequential reading.

4. The computer according to claim 1, wherein the storage medium access performance is an average access time, and wherein the copy destination writing performance index exceeds the copy source reading performance index such that a value calculated on the basis of the average access time relating to the copy destination is smaller than a value calculated on the basis of the average access time relating to the copy source.

5. The computer according to claim 1, wherein the storage medium access performance is a data transfer speed during sequential writing, a data transfer speed during sequential reading, and an average access time, and wherein when an access classification parameter is received and the access classification parameter indicates sequential access, the performance calculation unit and the second storage device determination unit employ the data transfer speed during sequential writing and the data transfer speed during sequential reading, and when the access classification parameter indicates random access, the performance calculation unit and the second storage device determination unit employ the average access time.

* * * * *